United States Patent
Tsunokawa et al.

(10) Patent No.: US 8,548,243 B2
(45) Date of Patent: Oct. 1, 2013

(54) INFORMATION PROCESSING DEVICE, INFORMATION PROCESSING METHOD, AND PROGRAM

(75) Inventors: Motoki Tsunokawa, Chiba (JP); Masaaki Hoshino, Tokyo (JP); Kenichiro Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 13/023,791

(22) Filed: Feb. 9, 2011

(65) Prior Publication Data

US 2011/0222788 A1  Sep. 15, 2011

(30) Foreign Application Priority Data

Mar. 15, 2010 (JP) .................... 2010-057818
Nov. 8, 2010 (JP) .................... 2010-249463

(51) Int. Cl.
*G06K 9/00* (2006.01)

(52) U.S. Cl.
USPC ........... 382/181; 382/276; 382/224; 382/305; 382/209; 707/748; 707/723; 707/758; 707/665; 707/803; 707/754; 707/620; 707/634

(58) Field of Classification Search
CPC ................ H04N 1/32144; H04N 2201/328; H04N 1/32304; H04N 21/4622; H04N 2201/0087; H04N 2201/3266
USPC ........ 382/181, 276, 224, 305, 209; 345/805; 725/45, 34, 35; 707/748, 723, 758, 665, 707/803, 754, 620, 634
See application file for complete search history.

(56) References Cited

U.S. PATENT DOCUMENTS

2004/0080541 A1* 4/2004 Saiga et al. .................. 345/805
2007/0245375 A1* 10/2007 Tian et al. ....................... 725/45

FOREIGN PATENT DOCUMENTS

JP          11-282866          10/1999

* cited by examiner

*Primary Examiner* — Mike Rahmjoo
(74) *Attorney, Agent, or Firm* — Oblon, Spivak, McClelland, Maier & Neustandt, L.L.P.

(57) ABSTRACT

An information processing device includes a recognition section for recognizing a feature keyword representing a feature of at least part of text content, an additional information acquisition section for acquiring additional information related to the text content from an outside of the text content in response to the recognized feature keyword, and a control section for controlling the additional information acquired by the additional information acquisition section to be output along with the part of the text content.

15 Claims, 18 Drawing Sheets

FIG.3

| SCENE | METADATA ITEM | | | |
| --- | --- | --- | --- | --- |
| | EXISTENTIAL CASE | FEATURE KEYWORD | EXISTENTIAL IMITATIVE SOUND | MOOD (ATMOSPHERE/EMOTION) |
| SCENE 1 | NOMINATIVE CASE | BANANA | BOOM | HAPPY |
| | LOCATIVE CASE | PRIME MINISTER | BANG | FUN |
| | TEMPORAL CASE | PACIFIC | | NOISY |
| | INSTRUMENTAL CASE | PC | | ANGER |
| SCENE 2 | NOMINATIVE CASE | SINGER | ARGH | SAD |
| | TEMPORAL CASE | SING | | CALM |
| | OBJECTIVE CASE | BEAUTIFUL | | |
| | SOURCE CASE | | | |
| | GOAL CASE | | | |
| ... | ... | ... | ... | ... |

| SCENE 76 | SCENE 75 |
|---|---|
| NOMINATIVE CASE: SUZUKI | NOMINATIVE CASE: YAMADA |
| LOCATIVE CASE: OSAKA | LOCATIVE CASE: KYOTO |
| TEMPORAL CASE: THIS SUMMER | TEMPORAL CASE: THIS SUMMER |
| FEATURE KEYWORD: TAKOYAKI, ATE OUT, BODY WEIGHT | FEATURE KEYWORD: TEMPLES AND SHRINES, HOLIDAY |
| MOOD: GOOD | MOOD: CALM |
| ♪ BGM OF FUN ATMOSPHERE | ♪ BGM OF CALM ATMOSPHERE |

FIG.13

| EXISTENTIAL CASE | METADATA ITEM | | |
| --- | --- | --- | --- |
| | FEATURE KEYWORD | EXISTENTIAL IMITATIVE SOUND | MOOD (ATMOSPHERE/EMOTION) |
| NOMINATIVE CASE | BANANA | BOOM | HAPPY |
| LOCATIVE CASE | PRIME MINISTER | BANG | FUN |
| TEMPORAL CASE | PACIFIC | ARGH | NOISY |
| INSTRUMENTAL CASE | PC | ... | ANGER |
| OBJECTIVE CASE | SINGER | | SAD |
| SOURCE CASE | SING | | CALM |
| GOAL CASE | BEAUTIFUL | | ... |
| ... | ... | | |

FIG.14

<例文>「坂本龍馬について述べたいと思う。坂本龍馬は幕末に活躍した。日本人は坂本龍馬が好きである。」
<EXAMPLE SENTENCE> [I WANT TO TALK ABOUT SAKAMOTO RYOMA. SAKAMOTO RYOMA WAS ACTIVE AT THE END OF THE EDO PERIOD. THE JAPANESE LIKE SAKAMOTO RYOMA.]

<PART OF MORPHOLOGICAL ANALYSIS RESULT>

坂本龍馬 (SAKAMOTO RYOMA)    NOUN: PERSON
に    AUXILIARY WORD
...

坂本龍馬 (SAKAMOTO RYOMA)    NOUN: PERSON
は    AUXILIARY WORD
...

坂本龍馬 (SAKAMOTO RYOMA)    NOUN: PERSON
を    AUXILIARY WORD
...

<PART-OF-SPEECH COEFFICIENT TABLE>

| PART OF SPEECH | PART-OF-SPEECH COEFFICIENT |
|---|---|
| NOUN: PERSON | 3 |
| NOUN: PLACE NAME | 2 |
| ... | ... |

SAKAMOTO RYOMA: 3 POINTS FOR PART-OF-SPEECH COEFFICIENT + 3 POINTS FOR OCCURRENCE FREQUENCY = SCORE VALUE (6 POINTS)

INFORMATION PROCESSING DEVICE, INFORMATION PROCESSING METHOD, AND PROGRAM

BACKGROUND OF THE INVENTION

1. Field of the Invention

The present invention relates to an information processing device, an information processing method, and a program.

2. Description of the Related Art

Techniques of browsing a book in a paperless type by reproducing electronic book data (text data) in which content of a certain book is digitized in the mobile information terminal of an electronic book reader are being widely used. The electronic book sometimes includes illustrations, but, of course, usually includes only text. Thus, there is an advantage of a book in that users are requested to recall images assumed by a book author from only text, but there is a problem in that some users do not sufficiently feel realistic sensations therefrom.

To solve this problem, a technique of embedding imagery data of sounds, pictures, and the like in an electronic book in advance and inserting the embedded sounds or pictures into text in response to environmental information of a heart rate of a user has been proposed (see Japanese Patent Application Laid-Open No. 11-282866).

SUMMARY OF THE INVENTION

However, if the imagery data of sounds, pictures, and the like is embedded as in the method disclosed in Japanese Patent Application Laid-Open No. 11-282866, the time and effort to collect the imagery data and embed it in electronic book data in advance should be taken, and thus there is a problem in that it is not easy to manufacture the electronic book data. There is a problem in that it is difficult to apply the above-described method to all books converted into electronic form and books to be converted into electronic form in the future.

In light of the foregoing, it is desirable to provide an information processing device, an information processing method, and a program that can more easily give a realistic sensation to text content.

According to an embodiment of the present invention, there is provided an information processing device including a recognition section for recognizing a feature keyword representing a feature of at least part of text content; an additional information acquisition section for acquiring additional information related to the text content from an outside of the text content in response to the recognized feature keyword; and a control section for controlling the additional information acquired by the additional information acquisition section to be output along with the part of the text content.

The recognition section may recognize the feature keyword representing the feature of at least the part of the text content by morphological analysis.

The recognition section may recognize a part of speech of at least the part of the text content as the feature keyword.

The recognition section may recognize a case of at least the part of the text content as the feature keyword.

The recognition section may recognize a modification relation between a case and a predicate of at least the part of the text content.

The recognition section may further specify a scene of at least the part of the text content on the basis of the recognized feature keyword.

The recognition section may register the extracted feature keyword as metadata associated with the specified scene.

The additional information acquisition section may search a database provided in an outside using the feature keyword extracted by the recognition section, and acquire information obtained from a search result as the additional information.

The recognition section may specify an atmosphere of the scene on the basis of at least any one of the recognized feature keyword and the text content, and the additional information acquisition section may select music to be reproduced in the scene on the basis of the atmosphere of the scene specified by the recognition section.

According to another embodiment of the present invention, there is provided an information processing method including the steps of: recognizing a feature keyword representing a feature of at least part of text content; acquiring additional information related to the text content from an outside of the text content in response to the recognized feature keyword; and controlling the acquired additional information to be output along with the part of the text content.

According to still another embodiment of the present invention, there is provided a program for causing a computer to realize: a recognition function of recognizing a feature keyword representing a feature of at least part of text content, an additional information acquisition function of acquiring additional information related to the text content from an outside of the text content in response to the recognized feature keyword; and a control function of controlling the additional information acquired in the additional information acquisition function to be output along with the part of the text content.

According to the present invention as described above, it is possible to more easily give a realistic sensation to text content.

BRIEF DESCRIPTION OF THE DRAWINGS

FIG. 3 is an illustrative diagram showing an example of metadata according to the same embodiment;

FIG. 13 is an illustrative diagram showing an example of metadata according to the same embodiment;

FIG. 14 is an illustrative diagram showing an example of a feature keyword extraction method according to the same embodiment;

DETAILED DESCRIPTION OF THE EMBODIMENTS

Figure 1:
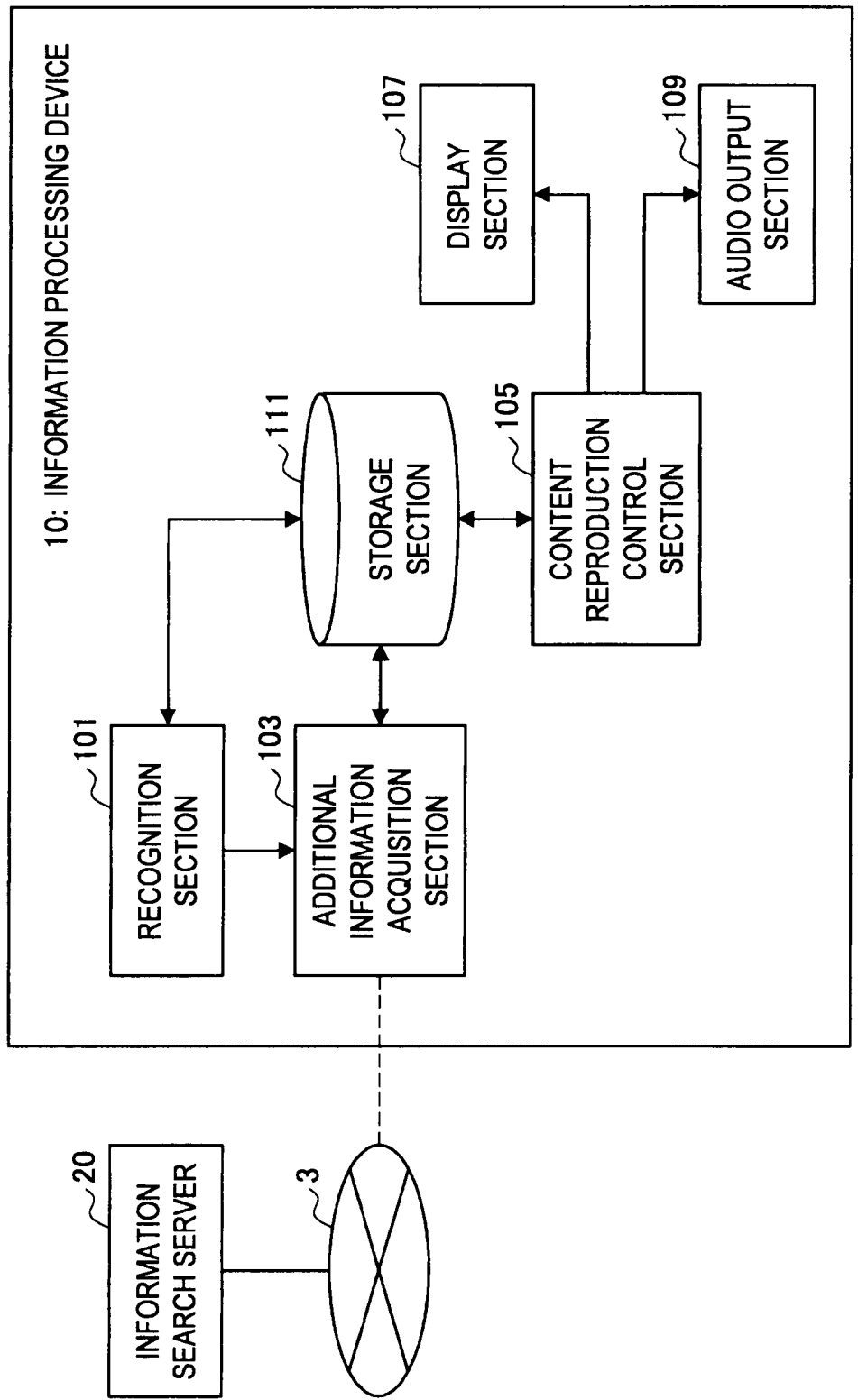
FIG. 1 is a block diagram showing a configuration of an information processing device according to a first embodiment of the present invention.

Hereinafter, preferred embodiments of the present invention will now be described in detail with reference to the appended drawings. In this specification and the drawings, elements having substantially the same functional configurations are denoted by the same reference numerals, and redundant description thereof is omitted.

Figure 2:
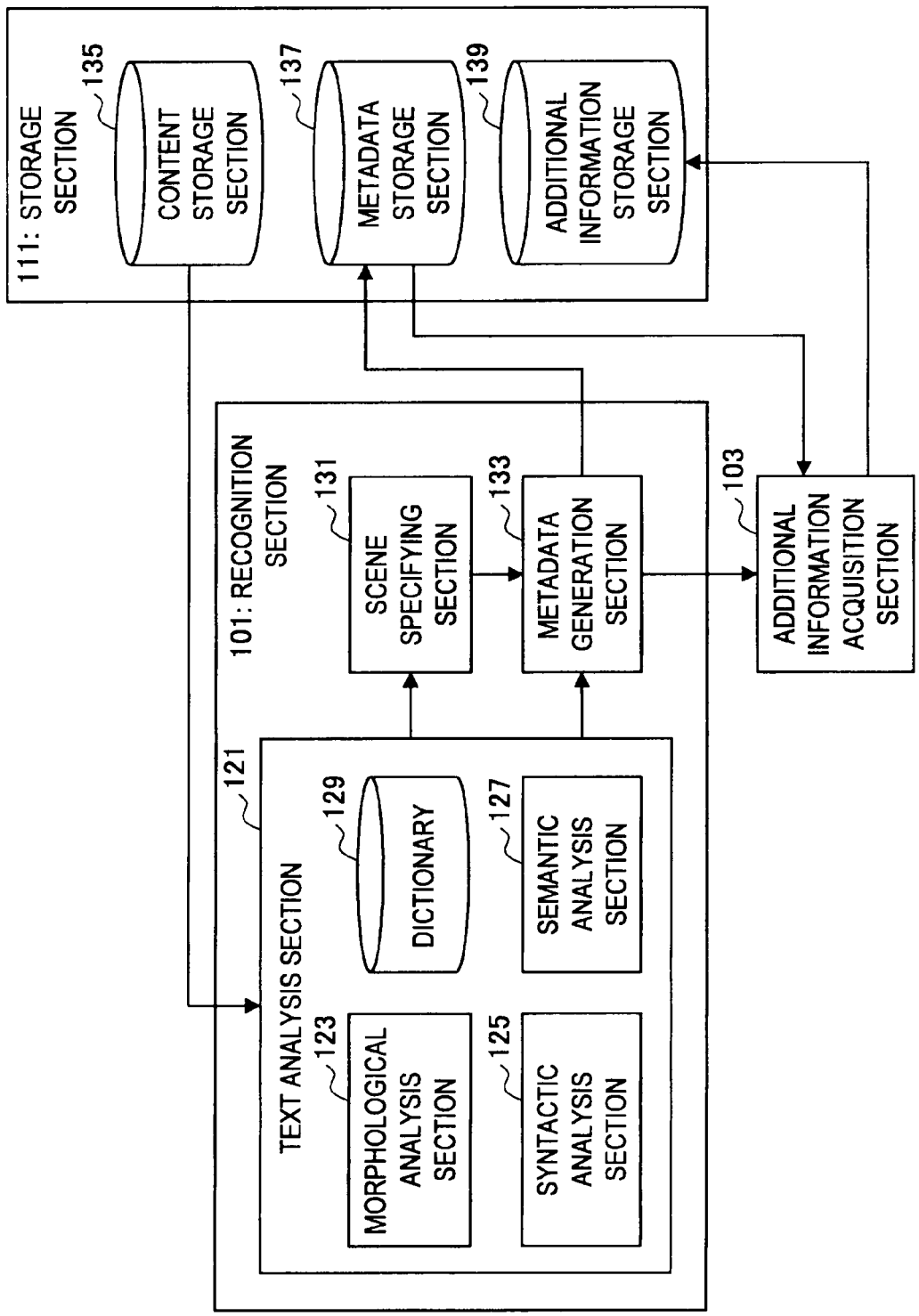
FIG. 2 is a block diagram illustrating the configuration of the information processing device according to the same embodiment.
Figure 4:
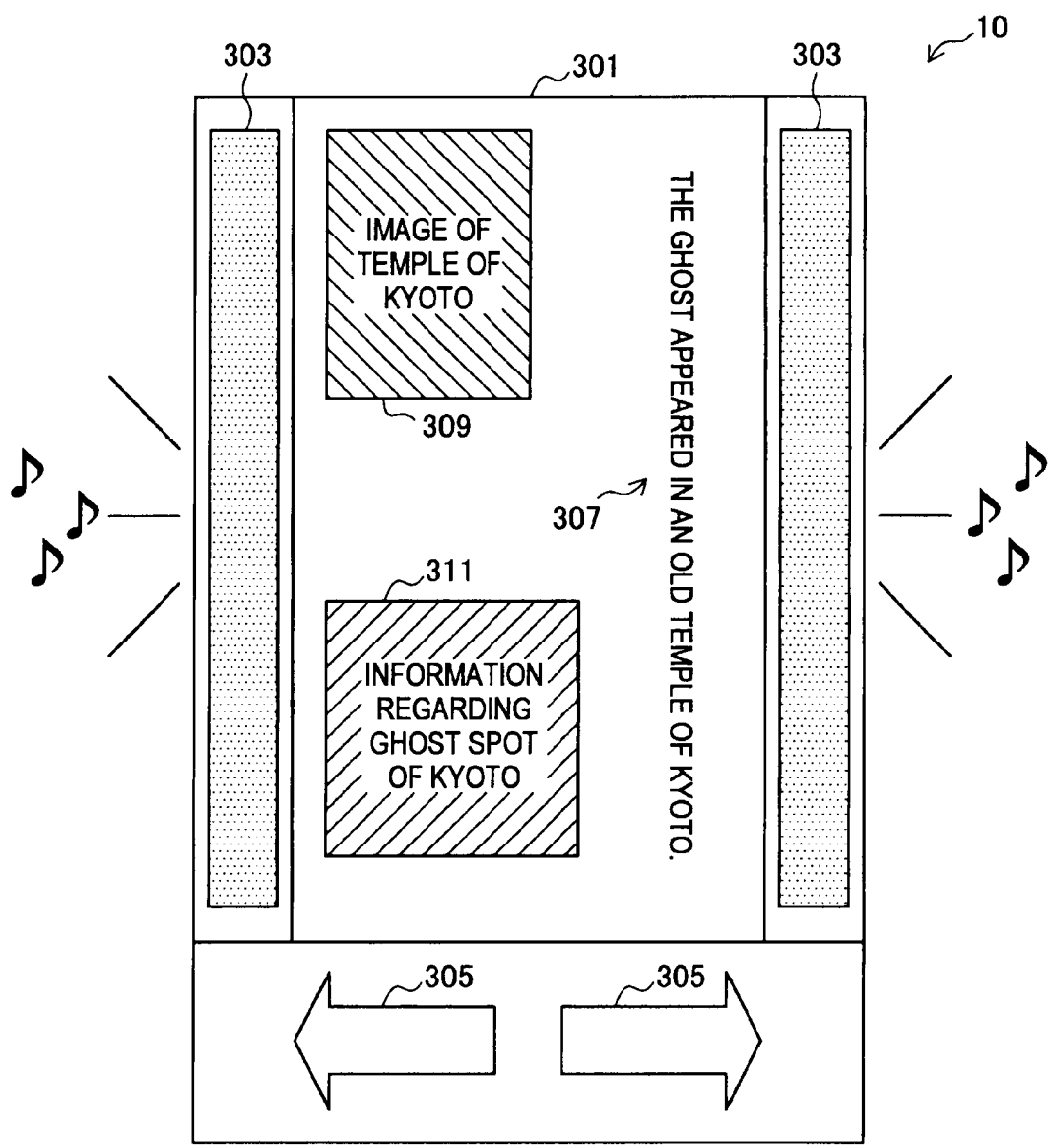
FIG. 4 is an illustrative diagram showing an example of the information processing device according to the same embodiment.
Figure 5:
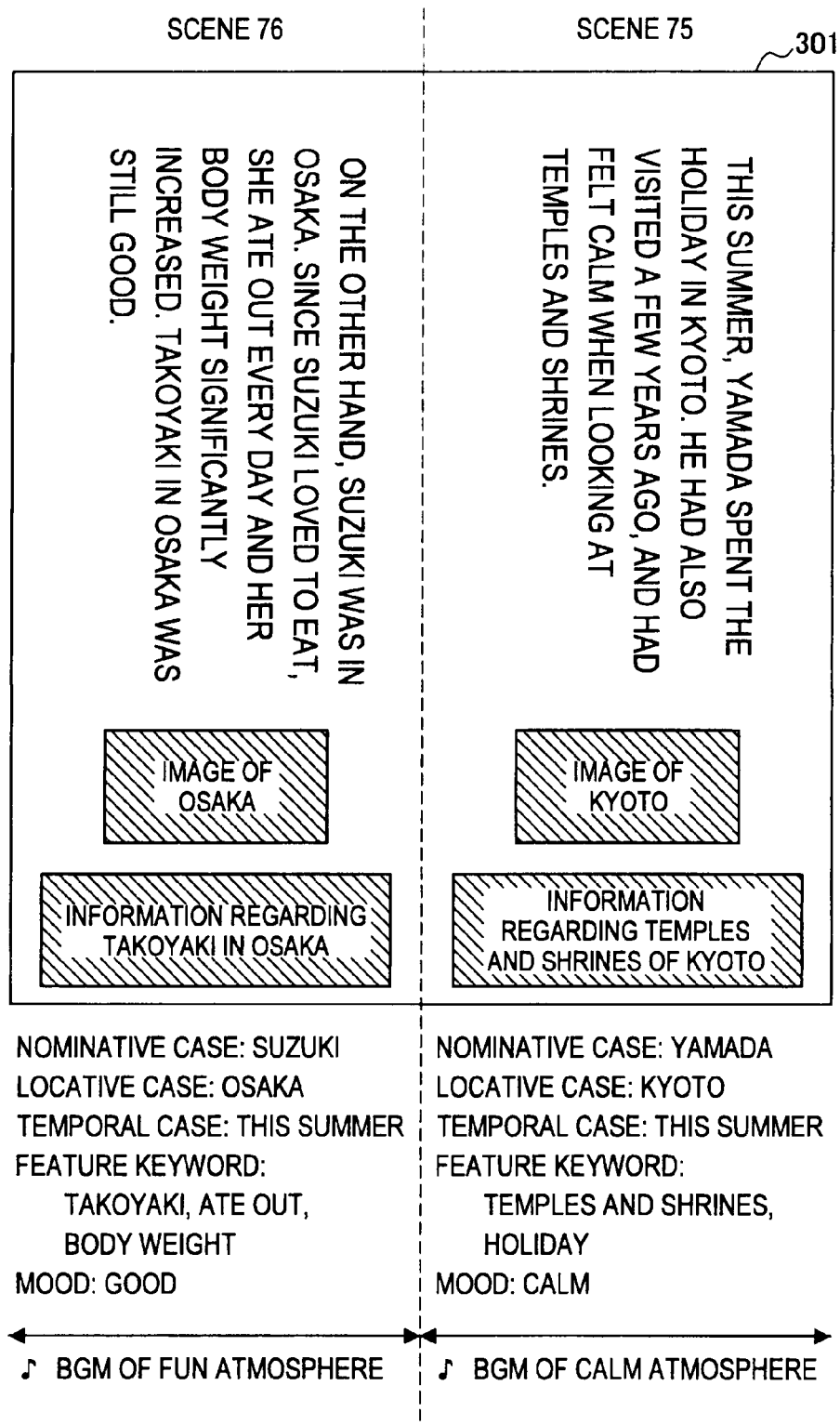
FIG. 5 is an illustrative diagram showing an example of an information processing method according to the same embodiment.

Description is given in the following order.
(1) First Embodiment
(1-1) Configuration of Information Processing Device
(2) Second Embodiment
(2-1) Information Processing System
(2-2) Configuration of Information Processing System
(3) Information Processing Method according to First and Second Embodiments of Present Invention
(4) Third Embodiment
(4-1) Configuration of Information Processing Device
(4-2) Information Processing Method
(5) Hardware Configuration of Information Processing Device according to Embodiment of Present Invention
(6) Summary First Embodiment Configuration of Information Processing Device First, the configuration of the information processing device according to the first embodiment of the present invention will be described in detail with reference to FIGS. 1 to 5. FIGS. 1 and 2 are block diagrams showing the configuration of the information processing device according to this embodiment. FIG. 3 is an illustrative diagram showing an example of metadata according to this embodiment. FIG. 4 is an illustrative diagram showing an example of the information processing device according to this embodiment. FIG. 5 is an illustrative diagram showing an example of an information processing method according to this embodiment.

An information processing device 10 according to this embodiment is a device capable of displaying text content including at least text data, and displays acquired text content on a display section of a display or the like provided in the device. The information processing device 10 can access an information search server 20 via an external network such as the Internet 3.

As shown in FIG. 1, the information processing device 10 mainly includes a recognition section 101, an additional information acquisition section 103, a content reproduction control section 105, a display section 107, an audio output section 109, and a storage section 111.

For example, the recognition section 101 is realized by a central processing unit (CPU), a read only memory (ROM), a random access memory (RAM), or the like. The recognition section 101 analyzes at least part of the text content using various types of methods, and recognizes a case of text included in the analyzed part of the text content.

The "case" influences a semantic role of a verb to each phrase in a sentence. Here, attention focuses on deep cases such as a nominative case, a temporal case, or a locative case.

If the recognition section 101 recognizes the case of the at least part of the text content, information regarding a recognition result is stored in a predetermined storage position of the storage section 111 to be described later. Also, the recognition section 101 outputs the information regarding the recognition result to the additional information acquisition section 103 to be described later.

A detailed configuration and function of the recognition section 101 will be described again below.

For example, the additional information acquisition section 103 is realized by a CPU, a ROM, a RAM, a communication device, or the like. In response to the case recognized by the recognition section 101, the additional information acquisition section 103 acquires additional information related to the text content from the outside of the text content. For example, the additional information may include audio information such as a sound effect, BGM, or the like, image information of a still image and a motion image regarding a still life, a landscape, a person, or the like, text information such as a meaning of a certain phrase or related information related to the certain phrase, or the like. This example of the additional information is only exemplary, and the present invention is not limited thereto.

Here, the outside of the text content indicates that the additional information related to the text content is not included in the text content itself. The additional information acquisition section 103 can acquire the above-described additional information from the storage section 111 or a removable recording medium inserted into a drive provided in the information processing device 10 to be described later. The additional information acquisition section 103 may directly acquire the additional information as described above from an external connection device connected to a connection port provided in the information processing device 10. The additional information acquisition section 103 may acquire the additional information as described above using a search engine (database) provided in the information search server 20 via an external network such as the Internet 3.

Detailed processing when the additional information acquisition section 103 acquires the additional information will be described again below.

The additional information acquisition section 103 stores the acquired additional information in a predetermined position of the storage section 111 to be described later.

For example, the content reproduction control section 105 is realized by a CPU, a ROM, a RAM, or the like. The content reproduction control section 105 is an example of a control section provided in the information processing device 10 according to the present invention. The content reproduction control section 105 controls the reproduction of text content and the output of additional information so that the additional information acquired by the additional information acquisition section 103 is output along with part of the text content. At this time, the content reproduction control section 105 acquires the text content, the additional information, or the like from a predetermined portion of the storage section 111 to be described later. The content reproduction control section 105 may acquire metadata or the like associated with the text content in addition to the above-described information, and may use the acquired metadata to control the content reproduction or to output the additional information.

The content reproduction control section 105 displays text included in the text content on the display section 107 to be described later. If information capable of being browsed such as image information or text information is output as the additional information, the content reproduction control section 105 displays the additional information on the display section 107 to be described later. If audible information such as audio information is output as the additional information, the content reproduction control section 105 outputs the additional information via the audio output section 109.

The content reproduction control section 105 may output a control signal for controlling the operations of various types of devices such as a vibrating motor and the like provided in the information processing device 10, as the additional information. Thereby, if the information processing device 10 has a vibrator function including the vibrating motor or the like, it is possible to vibrate the information processing device 10 itself in accordance with the reproduction of the text content.

The display section 107 is an example of an output device provided in the information processing device 10. The display section 107 is a display or the like provided in the information processing device 10, and displays text content or additional information capable of being browsed under control of the content reproduction control section 105. Also, the display section 107 may be a display having a touch panel or the like. In this case, the display section 107 itself may function as an input device.

The audio output section 109 is an example of the output device provided in the information processing device 10. The audio output section 109 is a speaker or the like provided in the information processing device 10, and outputs audible additional information under control of the content reproduction control section 105. Although the audio output section 109 is shown in FIG. 1, the information processing device 10 may not include the audio output section 109.

The storage section 111 is an example of a storage device provided in the information processing device 10. In the storage section 111, real data of text content capable of being reproduced by the information processing device 10 is stored. Also, in the storage section 111, information regarding a recognition result of text content by the recognition section 101 or various types of information accompanying the recognition result is stored. Also, in the storage section 111, various types of additional information acquired by the additional information acquisition section 103 are stored.

In the storage section 111, various types of history information such as history information regarding the reproduction of text content may be recorded. In addition, in the storage section 111, various types of parameters to be stored when the information processing device 10 according to this embodiment performs any processing, the progress during processing, or various types of databases are appropriately recorded.

Each processing section included in the information processing device 10 having the recognition section 101, the additional information acquisition section 103, the content reproduction control section 105, the display section 107, the audio output section 109, and the like can freely perform write and read operations on the storage section 111.

[Recognition Section]

Subsequently, a detailed configuration of the recognition section 101 provided in the information processing device 10 according to this embodiment will be described with reference to FIG. 2.

The recognition section 101 also includes a text analysis section 121, a scene specifying section 131, and a metadata generation section 133 as shown in FIG. 2.

For example, the text analysis section 121 is realized by a CPU, a ROM, a RAM, or the like. The text analysis section 121 analyzes a case of a word included in text by analyzing the text of text content, and also extracts various other information regarding the text.

As shown in FIG. 2, the text analysis section 121 also has a morphological analysis section 123, a syntactic analysis section 125, a semantic analysis section 127, and a dictionary memory section 129.

For example, the morphological analysis section 123 is realized by a CPU, a ROM, a RAM, or the like. The morphological analysis section 123 is a processing section that performs morphological analysis for data (text data) regarding text of text content acquired from the content storage section 135 provided in the storage section 111. Thereby, the text of the text content is divided into a plurality of morphemes. Here, a morpheme is a minimum unit having a unitary meaning appearing in a real sentence. It is possible to specify the part of speech of a word included in the text of the text content by dividing the text of the text content into morphemes.

Various algorithms for performing morphological analysis have been proposed, and the morphological analysis section 123 can perform the morphological analysis using any algorithm.

The morphological analysis section 123 can use various types of dictionary files stored in the dictionary memory section 129 to be described later upon morphological analysis for the text of the text content.

If the morphological analysis for the text of the text content is terminated, the morphological analysis section 123 outputs information (information regarding a word included in the text and a part of speech of the word) regarding an obtained analysis result to the syntactic analysis section 125 to be described later. The morphological analysis section 123 may store the information regarding the obtained analysis result in the storage section 111 or the like. Each processing section provided in the recognition section 101 can appropriately use the information of the analysis result of the morphological analysis by the morphological analysis section 123.

For example, the syntactic analysis section 125 is realized by a CPU, a ROM, a RAM, or the like. The syntactic analysis section 125 is a processing section that performs syntactic analysis/parsing for the data regarding the text of the text content. The syntactic analysis section 125 grammatically analyzes the text of the text content using the information regarding the analysis result of the morphological analysis by the morphological analysis section 123, and divides the text into a plurality of phrases. Thereby, it is possible to specify a grammatical role of a word included in the text of the text content and also determine a modification relation between words, or a case.

Various algorithms for performing syntactic analysis have been proposed, and the syntactic analysis section 125 can perform the syntactic analysis using any algorithm.

The syntactic analysis section 125 can use various types of dictionary files stored in the dictionary memory section 129 to be described later upon syntactic analysis for the text of the text content.

For example, a type of case determined by the syntactic analysis section 125 is shown in the following Table 1. The case shown in the following Table 1 is only exemplary, and it is possible to appropriately use a case output by an algorithm used by the syntactic analysis section 125.

| Type of Case (Name) | Semantic Role |
| --- | --- |
| Nominative case (Agent) | Subject who performs the action |
| Locative case (Location) | Location or place where the action is performed |
| Temporal case (Time) | Time when the action is performed |
| Instrumental case (Instrument) | Thing to be used when the action is performed |
| Objective case (Object) | Someone/thing serving as an object of the action |
| Source case (Source) | Starting point or initial state of the action |
| Goal case (Goal) | End point or final state of the action |
| Experiencer case (Experiencer) | Someone/thing who experiences the action |

When the syntactic analysis for the text of the text content is terminated, the syntactic analysis section 125 outputs information regarding the obtained analysis result (information indicating which word corresponds to each case in the text, or the like) to the semantic analysis section 127 to be described later. Also, the syntactic analysis section 125 may store the information regarding the obtained analysis result in the storage section 111 or the like. Also, the syntactic analysis section 125 outputs the information regarding the obtained analysis result to the scene specifying section 131 and the metadata generation section 133 to be described later.

For example, the semantic analysis section 127 is realized by a CPU, a ROM, a RAM, or the like. The semantic analysis section 127 is a processing section that performs semantic analysis for data regarding the text of the text content. The semantic analysis section 127 analyzes the text of the text content using the information regarding the analysis results by the morphological analysis section 123 and the syntactic analysis section 125, and specifies a semantic relation between words included in the text. Thereby, the semantic analysis section 127 can recognize a concept for the text of the text content and also specify modality or the like for the text of the text content. As a result, the semantic analysis section 127 can recognize the atmosphere of a sentence such as bright, romantic, fearful, or the like, or the emotion (that is, mood) implied in the sentence, from the text of the text content.

Here, the modality indicates a determination of the subject or a mental attitude for content indicated by the sentence. As an example of the modality, there are various things such as a thing indicating the tense, a thing indicating logic ("and," "or," or negation), a thing indicating a desire or command, a thing indicating the continuation, repetition, or completion of an operation, and the like.

Various algorithms for performing semantic analysis have been proposed, and the semantic analysis section 127 can perform the semantic analysis using any algorithm.

The semantic analysis section 127 can use various types of dictionary files stored in the dictionary memory section 129 to be described later upon semantic analysis for the text of the text content.

When the semantic analysis for the text of the text content is terminated, the semantic analysis section 127 outputs information regarding an obtained analysis result to the scene specifying section 131 and the metadata generation section 133. Also, the semantic analysis section 127 may store the information regarding the obtained analysis result in the storage section 111 or the like.

In the dictionary memory section 129, various types of dictionaries to be used when each analysis section provided in the text analysis section 121 performs analysis are stored. For example, examples of the dictionaries include a morpheme-related database, a word dictionary, a concept dictionary, and the like. These dictionaries may be commonly used in processing sections, and may be specialized in the processing sections. These dictionaries may be general purpose to be used regardless of a genre of text content, and may be specialized for any genre prepared for each genre of text content.

The text analysis section 121 provided in the recognition section 101 has been described above in detail.

For example, the scene specifying section 131 is realized by a CPU, a ROM, a RAM, or the like. The scene specifying section 131 specifies a scene of content using a case of text (more specifically, a temporal case and a locative case) analyzed by the text analysis section 121.

Since information regarding words corresponding to the temporal case and the locative case is included in the analysis results by the text analysis section 121, the scene specifying section 131 can recognize when and where a focused sentence has been generated using the above-described information. Accordingly, the scene specifying section 131 can integrate sentences having the same temporal case or the same locative case as sentences belonging to the same scene. If the temporal case or the locative case varies between sentences, the scene specifying section 131 can recognize that a scene varies between focused sentences. By performing this processing, the scene specifying section 131 can classify content text for each scene.

According to text, the locative case may vary, but the temporal case may not vary, between sentences. In this case, the scene specifying section 131 may specify two sentences as the same scene by assuming that the temporal case does not vary, or may specify the two sentences as different scenes. By handling the temporal case more preferentially than the locative case, the scene specifying section 131 can roughly divide the text of the text content into scenes. By equally handling the temporal case and the locative case, the scene specifying section 131 can minutely divide the text of the text content into scenes.

According to text, the temporal case or the locative case may not be included in a focused sentence. In this case, the scene specifying section 131 may perform the processing by assuming that the temporal case or the locative case of the text before the focused sentence continues in the focused sentence.

According to text content, text may be described after paragraphing or chaptering in advance. In this case, the scene specifying section 131 can decide a content scene on the basis of paragraphing or chaptering preset in the text. Even when the scene is decided on the basis of paragraphing or chaptering, the scene specifying section 131 may divide the sentences into more detailed scenes using the above-described means.

If a scene of text of text content is specified, the scene specifying section 131 outputs information indicating a scene specification result (information regarding a sentence belonging to the same scene, information regarding a position where a scene varies, or the like) to the metadata generation section 135 to be described later. Also, the scene specifying section 131 may store the scene specification result in the storage section 111.

For example, the metadata generation section 133 is realized by a CPU, a ROM, a RAM, or the like. The metadata generation section 133 generates metadata related to the text content using the text analysis results by the text analysis section 121 and the scene specification result by the scene specifying section 131.

FIG. 3 is an example of items and content pieces of the metadata generated by the metadata generation section 133. As illustrated in FIG. 3, for each scene of text, the metadata generation section 133 generates information regarding cases of a sentence within the scene, information regarding a characteristic keyword (feature keyword) in the sentence within the scene, information regarding an imitative sound in the sentence within the scene, and information regarding an atmosphere (mood or emotion) of the scene as metadata.

The metadata generation section 133 generates the information regarding the cases of the sentence within the scene using the analysis result by the syntactic analysis section 125. The metadata generation section 133 may record all analysis results regarding the cases as the metadata, or may record results regarding only cases useful when the information processing device 10 performs processing such as scene determination processing, keyword extraction processing, additional information extraction processing, or the like.

Only names of cases of a sentence within a scene are described in FIG. 3, but the case names may be associated with corresponding words in the sentence.

The metadata generation section 133 extracts the characteristic keyword in the sentence within the scene, and records the extracted characteristic keyword as the metadata. The metadata generation section 133 is based on the analysis results by the morphological analysis section 123 and the syntactic analysis section 125, extracts feature keywords on the basis of parts of speech, word occurrence frequencies, cases, and the like, and arranges and stores the feature keywords in order of priority. After a dictionary file including only the feature keywords is prepared, the metadata generation section 133 may extract words included in the above-described dictionary file as the feature keywords.

In the example shown in FIG. 3, "banana," "prime minister," "pacific," "PC," "singer," "sing," and "beautiful" are extracted as the feature keywords. As apparent from this extraction example, the metadata generation section 133 does not extract only nouns as the feature keywords.

Only the extracted feature keywords are described in the example shown in FIG. 3, but various types of attribute information of attributes of the feature keywords, genres, and higher concepts including the feature keywords may be associated with the feature keywords. For example, since the noun "banana" is a "food," the attribute information of "food" that is a higher concept to "banana" may be associated. Using the attribute information, the additional information acquisition section 103 of the information processing device 10 can acquire additional information on the basis of various concepts including the keywords as well as the extracted keywords.

The metadata generation section 133 extracts information regarding an imitative sound in a sentence within a scene on the basis of the analysis result by the morphological analysis section 123. That is, the metadata generation section 133 extracts a word determined as the imitative sound from the sentence by morphological analysis, and uses it as the metadata. After a dictionary file including only feature keywords is prepared in advance, the metadata generation section 133 may extract a word included in the dictionary file as a feature keyword.

In the example shown in FIG. 3, "boom," "bang," and "argh" as imitative sounds in the sentence are extracted by the metadata generation section 133.

The metadata generation section 133 determines the mood (atmosphere or emotion) of a scene using the analysis result in the semantic analysis section 127, and records a determination result as information regarding the mood of the scene. Since analysis processing is performed using the concept dictionary stored in the dictionary memory section 129 or the like, the semantic analysis section 127 can output results regarding a stem, an atmosphere, an emotion, or the like of a word in a sentence using an analysis result. The moods "happy," "fun," "noisy," "anger," "sad" and "calm" as shown in FIG. 3 can be generated as the metadata using the analysis result.

The metadata generation section 133 stores the metadata generated as described above in the metadata storage section 137 provided in the storage section 111. Thereby, the additional information acquisition section 103 or the content reproduction control section 105 provided in the information processing device 10 can freely use the metadata stored in the metadata storage section 137. The metadata generation section 133 may directly output the metadata generated as described above to the additional information acquisition section 103.

A metadata format shown in FIG. 3 is only exemplary, and a metadata structure according to the present invention is not limited to the example shown in FIG. 3.

[Acquisition of Additional Information]

Subsequently, additional information acquisition processing in the additional information acquisition section 103 will be described with reference to FIGS. 2 and 3.

As described above, the additional information acquisition section 103 acquires additional information related to corresponding text content from the outside of the text content. At this time, the additional information acquisition section 103 acquires the additional information using the feature keywords extracted by the metadata generation section 133 on the basis of the analysis results by the morphological analysis section 123 and the syntactic analysis section 125 or the cases specified on the basis of the analysis result by the syntactic analysis section 125.

If audio information such as sound effects/BGM is acquired as the additional information related to the text content, the additional information acquisition section 103 searches for or acquires the audio information as described below. That is, the additional information acquisition section 103 can search for and acquire the sound effects or BGM using the information regarding the cases stored in the metadata as shown in FIG. 3 acquired from the metadata storage section 137 or the like.

For example, if the locative case is the metadata regarding the case, the additional information acquisition section 103 can search for and acquire music suitable for the locative case for use in BGM. For example, if the place name "Okinawa" is described in the locative case, the additional information acquisition section 103 can acquire music (for example, a folk song of Okinawa, or the like) suitable for the locative case for use as BGM by designating the place name "Okinawa" as the keyword. It is possible to improve the realistic sensation by outputting the music acquired as described above as BGM of a corresponding scene.

The additional information acquisition section 103 can acquire BGM using the metadata regarding the feature keywords as well as the metadata regarding the cases. In addition, the additional information acquisition section 103 can acquire music suitable for the mood of a corresponding scene by referring to the metadata regarding the mood as the additional information for BGM. For example, if the keyword "bright" is described as the metadata regarding the mood, the additional information acquisition section 103 can acquire the music of a bright tune and designate the music as the additional information. If the keyword "fearful" is described as the metadata regarding the mood, the additional information acquisition section 103 can acquire music suitable for the keyword "fearful" such as the theme music of a famous horror movie or the like and designate the music as the additional information.

The additional information acquisition section 103 can acquire a sound effect suitable for an imitative sound as the additional information using metadata regarding the imitative sound.

On the other hand, the additional information acquisition section 103 can acquire image information of a still image and a motion image regarding a still life, a landscape, a person, or the like as additional information related to the text content. In this case, the additional information acquisition section 103 searches for or acquires the image information as will be described below. That is, the additional information acquisition section 103 can search for and acquire various types of image information using information regarding cases stored in the metadata shown in FIG. 3.

For example, if the nominative case is metadata regarding a case, the additional information acquisition section 103 can search for and acquire image information regarding the nominative case. For example, if the personal name "Napoleon" is described in the nominative case, the additional information acquisition section 103 can acquire an image (for example, image information indicating a self-portrait of Napoleon, or the like) suitable for the nominative case by designating the personal name "Napoleon" as the keyword.

If the locative case is metadata regarding a case, the additional information acquisition section 103 can search for and acquire image information regarding the locative case. For example, if the place name "Kyoto" is described as the locative case, the additional information acquisition section 103 can acquire an image (for example, image information obtained by photographing Kyoto, or the like) suitable for the locative case by designating the place name "Kyoto" as the keyword.

If the temporal case is metadata regarding a case, the additional information acquisition section 103 can search for and acquire image information regarding the temporal case. For example, if the keyword "Christmas" is described in the temporal case, the additional information acquisition section 103 can acquire an image (for example, image information obtained by imaging a Christmas tree, or the like) suitable for the temporal case using the keyword "Christmas."

On the other hand, the additional information acquisition section 103 can acquire related information related to a meaning of a certain phrase or a certain phrase as additional information related to text content. In this case, the additional information acquisition section 103 searches for or acquires the related information as will be described below. That is, the additional information acquisition section 103 can search for and acquire various types of related information using information regarding feature keywords stored in the metadata shown in FIG. 3.

For example, if the term "regional system" is a feature keyword, the additional information acquisition section 103 can acquire text information or image information corresponding to a meaning or description of the feature keyword "regional system" using a search engine, a database, or the like, for example, present on the Internet, and designate the text information or the image information as the additional information. If the phrase "Brazil's population and land area" is the feature keyword, the additional information acquisition section 103 can acquire related information (text information, image information, or audio information) regarding a feature keyword using the search engine, the database, or the like.

After various types of additional information are acquired as described above, the additional information acquisition section 103 may generate association information indicating which additional information is acquired in which scene of which text content. In the association information, for example, for each scene of the text content, it is preferable to describe information indicating the classification (text information, image information, or audio information) of the acquired additional information for each scene of the text content and position information indicating a storage position where real data of each piece of the additional information is stored. It is possible to efficiently control the output of the additional information upon content reproduction if a time when an additional information acquisition processing is performed is earlier than that when text content is reproduced, by generating the association information.

After various types of additional information are acquired, the additional information acquisition section 103 may provide a description by associating position information indicating a storage position where read data of the acquired additional information is stored with corresponding metadata itself.

The number of additional information pieces acquired by the additional information acquisition section 103 is not limited to 1, and a plurality of additional information pieces may be acquired by considering a capacity size of a storage region provided in the storage section 111 or the like.

The additional information acquisition section 103 stores various types of additional information acquired as described above in the additional information storage section 139 provided in the storage section 111. Also, the additional information acquisition section 103 may directly output various types of acquired additional information to the content reproduction control section 105 to be described later. Here, not only the additional information stored in the additional information storage section 139 can be used for certain specific text content, but also any text content can appropriately use the additional information stored in the additional information storage section 139.

Here, text content recognition processing by the recognition section 101 and additional information acquisition processing by the additional information acquisition section 103 may be performed at any timing. For example, the recognition processing by the recognition section 101 and the additional information acquisition processing by the additional information acquisition section 103 may be performed at a time when content data is stored in the content storage section 135. The recognition processing and the additional information acquisition processing may be performed immediately after the reproduction of text content is initiated, or may be performed in parallel with the reproduction of text content. The recognition processing may be performed when text content is acquired or before the reproduction processing of text content is initiated. The additional information acquisition processing may be performed immediately after the initiation of reproduction of text content or in parallel with the reproduction of text content. Here, if the additional information acquisition processing is performed immediately after the initiation of reproduction of text content or in parallel with the reproduction, it is possible to acquire latest additional information.

[Content Reproduction Control Section]

Next, content reproduction control processing that is performed by the content reproduction control section 105 will be specifically described with reference to FIGS. 4 and 5.

As described above, the content reproduction control section 105 controls the reproduction of text content and the output of additional information so that the additional information acquired by the additional information acquisition section 103 is output along with part of the text content. The text content whose reproduction is controlled by the content reproduction control section 105 is stored, for example, in the content storage section 135 shown in FIG. 2, and the additional information whose output is controlled by the content reproduction control section 105 is stored, for example, in the additional information storage section 139 shown in FIG. 2. The content reproduction control section 105 performs the reproduction control and the output control by acquiring various types of data used from these storage sections.

Hereinafter, an example in which the content reproduction control section 105 controls the reproduction when the information processing device 10 according to this embodiment is an electronic book reader, which is a type of mobile information terminal, will be specifically described below.

For example, as shown in FIG. 4, the electronic book reader, which is an example of the information processing device 10, includes a display screen 301 on which text content and additional information are displayed and a speaker 303 from which audio information such as BGM or sound effects is output. In the electronic book reader, an input section 305 for a page flipping manipulation is provided.

Here, an arrangement of the display screen 301, the speaker 303, and the input section 305 shown in FIG. 4 is only exemplary, and a design of the information processing device 10 according to the present invention is not limited to the example shown in FIG. 4. The input section 305 shown in FIG. 4 may be a button or the like provided in the electronic book reader, or may be an object such as an icon displayed on the display screen 301. If a touch-panel-attached display is mounted on the electronic book reader, the display screen 301 may also be the input section 305.

If certain text content is selected by a user of the electronic book reader, the content reproduction control section 105 acquires real data of corresponding text content from the content storage section 135 and initiates content reproduction control processing. Thereby, a part 307 of the text content is displayed on the display screen 301 in response to the user's manipulation.

The content reproduction control section 105 specifies a scene of content displayed on the display screen 301 and acquires additional information associated with the scene from the additional information storage section 139. Thereafter, the control reproduction control section 105 performs output control so that the acquired additional information is output along with the part of the text content. Thereby, additional information related to the displayed content is displayed on the display screen 301.

For example, it is assumed that the text content part 307 of "The ghost appeared in an old temple of Kyoto," is displayed on the display screen 301 as shown in FIG. 4. At this time, from corresponding text, the locative case "old temple of Kyoto" is extracted, the feature keyword "ghost" is extracted, and the mood "fearful" is specified, in various types of processing by the recognition section 101.

When the text shown in FIG. 4 is displayed on the display screen 301, the content reproduction control section 105 displays additional information 309 regarding an image of a temple of Kyoto acquired using the extracted locative case and additional information 311 regarding a ghost spot of Kyoto acquired using the extracted feature keyword are displayed in accordance with the display screen 301. When the text shown in FIG. 4 is displayed on the display screen 301, the content reproduction control section 105 outputs music of a fearful mood acquired in accordance with a specified mood as BGM from the speaker 303.

Here, control may be performed so that the number or layout of additional information pieces displayed on the display screen 301 is within a preset number, or may be dynamically set in response to a size of the display screen 301, an image size of additional information, and the like. It is preferable that the additional information displayed on the display screen 301 be displayed not to overlap the text content part 307, and it is preferable that additional information pieces be displayed not to overlap each other. The content reproduction control section 105 may change a display amount of the content part 307 displayed on the display screen 301 in response to the number or layout of additional information pieces displayed on the display screen 301.

For example, text pieces belonging to different scenes may be displayed together within one display screen 301 as shown in FIG. 5. In this case, the content reproduction control section 105 performs control as follows.

Here, text belonging to a scene 75 and text belonging to a scene 76 are displayed on the display screen 301 as shown in FIG. 5, so that metadata as shown in FIG. 5 is generated in each scene and additional information is acquired.

Here, as shown in FIG. 5, the content reproduction control section 105 displays additional information such as image information or related information belonging to each scene around text belonging to the scene. The scene 75 of the example shown in FIG. 5 regards content performed by "Yamada" in the nominative case in "Kyoto" in the locative case. Additional information regarding an image of Kyoto and additional information regarding temples and shrines of Kyoto are displayed around the text corresponding to the scene 75. The scene 76 of the example shown in FIG. 5 regards content performed by "Suzuki" in the nominative case in "Osaka" in the locative case. Additional information regarding an image of Osaka and additional information regarding a takoyaki store in Osaka are displayed around the text corresponding to the scene 76. By displaying additional information in this layout policy, the user can easily determine which text is related to additional information displayed on the display screen 301.

If music is acquired as additional information, the content reproduction control section 105 can output BGM in accordance with the displayed scene. In the example shown in FIG. 5, scenes in which different BGMs are output are displayed together on the same display screen 301. Thus, it is necessary for the content reproduction control section 105 to switch BGM to be output at a certain point in time.

A point in time when BGM is switched can be specified by any method, but for example, the content reproduction control section 105 can specify the point in time when BGM to be output is switched as follows. For example, the information processing device 10 can store history information regarding the reproduction of text content in the storage section 111 or the like, and can calculate a rate at which the user has previously averagely switched a page on the basis of the above-described history information. The content reproduction control section 105 calculates a text reading rate of the user in advance, and calculates a time taken until the sentence beginning the scene 76 starts to be read using the number of characters displayed on the display screen 301 and the calculated text reading rate of the user. Thereafter, the content reproduction control section 105 decides a point in time when a time calculated by designating a point in time when switching to the display screen as shown in FIG. 5 has been performed to the starting point has elapsed, and switches BGM to be output after the point in time has elapsed.

Timing when a sound effect is output can be decided using a method of specifying a point in time when BGM to be output is switched as described above.

By performing this processing, the content reproduction control section 105 can control the output of audible additional information as well as visible additional information.

An example of a function of the information processing device 10 according to this embodiment has been described above. Each component described above may be configured using a general-purpose member or circuit, or may be configured by hardware specialized for a function of each component. All functions of the components may be performed by a CPU or the like. Accordingly, it is possible to change a configuration to be appropriately used in response to an occasional technical level at which this embodiment is performed.

It is possible to create a computer program for realizing each function of the information processing device according to this embodiment as described above and mount the computer program on a personal computer or the like. A computer readable recording medium storing this computer program can be provided. For example, the recording medium is a magnetic disk, an optical disc, a magneto-optical disc, a flash memory, or the like. For example, the above-described computer program may be distributed via a network without use of the recording medium.

Second Embodiment

Figure 6:
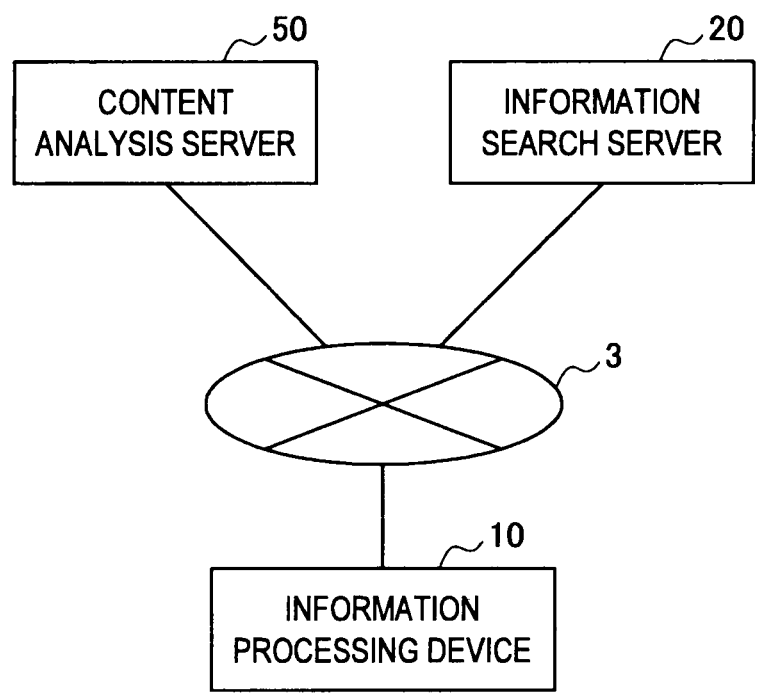
FIG. 6 is an illustrative diagram showing a configuration of an information processing system according to a second embodiment of the present invention.
Figure 7:
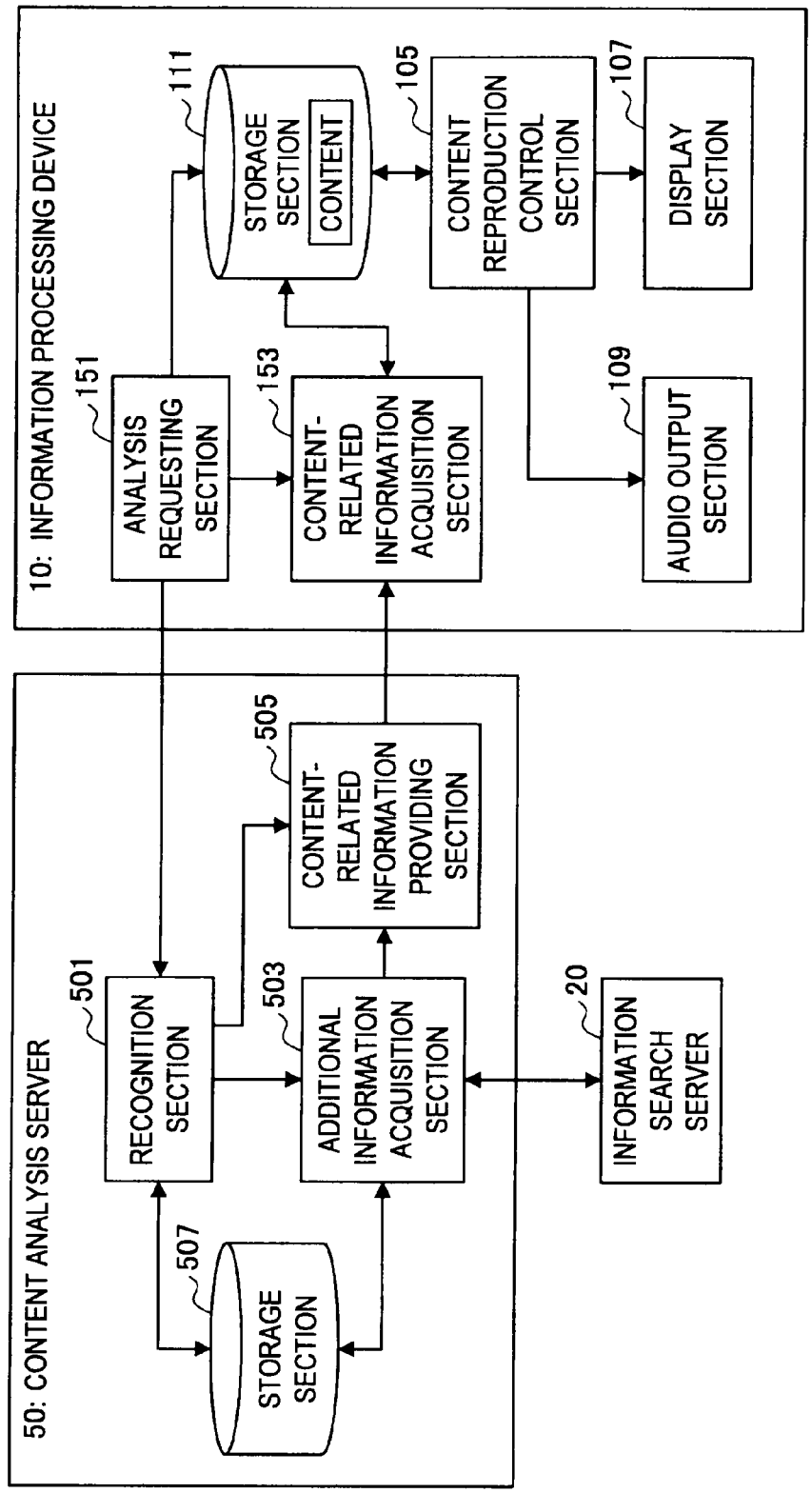
FIG. 7 is a block diagram showing the configuration of the information processing system according to the same embodiment.

Next, an information processing system according to the second embodiment will be described with reference to FIGS. 6 and 7. FIG. 6 is an illustrative diagram showing a configuration of the information processing system according the second embodiment of the present invention, and FIG. 7 is a block diagram showing the configuration of the information processing system according to this embodiment.

The case where the information processing device 10 performs text content recognition processing and additional information acquisition processing has been described in the first embodiment of the present invention. In the following second embodiment of the present invention, the case where at least any one of the text content recognition processing and the additional information acquisition processing shown in the first embodiment is performed by another device provided outside the information processing device 10 will be described.

<Information Processing System>

As shown in FIG. 6, an information processing system 1 according to this embodiment includes an information processing device 10, an information search server 20, and a content analysis server 50. The information processing device 10, the information search server 20, and the content analysis server 50 communicate with each other via a network 3.

The network 3 is a communication line network that enables the information processing device 10, the information search server 20, and the content analysis server 50 to bi-directionally communicate with each other. For example, the network is constituted by the Internet, a telephone line network, a satellite communication network, a public line network of a broadcast communication path or the like, a wide area network (WAN), a local area network (LAN), an Internet protocol virtual private network (IPVPN), Ethernet (registered trademark), a dedicated line network of a wireless LAN or the like, regardless of a wireless/wired mode. That is, the information processing system 1 according to this embodiment may be part of a public service using the public line network such as the Internet, and may be a private system that is not open to third parties using a home network using the LAN or the like.

Like the information processing device 10 according to the first embodiment of the present invention, the information processing device 10 is a device capable of outputting text content and additional information related to the text content. However, the information processing device 10 according to this embodiment is different from the information processing device 10 according to the first embodiment of the present invention in that the text content recognition processing and the additional information acquisition processing are performed in the content analysis server 50 provided outside the information processing device 10.

The information search server 20 is a server that manages a search engine or database, and is used when the content analysis server 50 to be described later searches for and acquires the additional information related to the text content.

The content analysis server 50 analyzes text content requested from the information processing device 10, and also acquires additional information related to the analyzed text content using an obtained analysis result. Thereafter, the content analysis server 50 provides the information processing device 10 with the text content analysis result and the acquired additional information as content-related information.

<Configuration of Information Processing System>

Next, the information processing device 10 and the content analysis server 50 according to this embodiment will be simply described with reference to FIG. 7.

[Configuration of Information Processing Device]

First, a configuration of the information processing device 10 according to this embodiment will be described.

For example, as shown in FIG. 7, the information processing device 10 according to this embodiment mainly includes a content reproduction control section 105, a display section 107, an audio output section 109, a storage section 111, an analysis requesting section 151, and a content-related information acquisition section 153.

Here, the content reproduction control section 105, the display section 107, the audio output section 109, and the storage section 111 provided in the information processing device 10 according to this embodiment have the same configurations as the processing sections provided in the information processing device 10 according to the first embodiment of the present invention, and have the same advantageous effects as those. Accordingly, detailed description of the processing sections is omitted hereinafter.

For example, the analysis requesting section 151 is realized by a CPU, a ROM, a RAM, a communication device, or the like. The analysis requesting section 151 requests the content analysis server 50 to perform various types of analyses of morphological analysis, syntactic analysis, and semantic analysis for text content. When the analysis requesting section 151 requests the content analysis server 50 to analyze the content, real data itself of desired text content to be analyzed may be transmitted along with information indicating the analysis request. If the content analysis server 50 is also a content providing server and retains desired text content to be analyzed, the analysis requesting section 151 may transmit information specifying the desired text content to be analyzed along with the information indicating the analysis request.

Timing when the analysis requesting section 151 requests the content analysis server 50 to perform various types of analyses may be any timing when text content is acquired, immediately after the reproduction of text content is initiated, or while text content is reproduced.

If the analysis requesting section 151 requests the content analysis server 50 to analyze the text content, the analysis request is reported to the content-related information acquisition section 153 to be described later.

For example, the content-related information acquisition section 153 is realized by a CPU, a ROM, a RAM, a communication device, or the like. The content-related information acquisition section 153 acquires a string of information (content-related information), which is related to the text content of the analysis request from the analysis requesting section 151 to the content analysis server 50, from the content analysis server 50. Here, the content-related information acquired from the content analysis server 50 includes various types of analysis results regarding the text content, metadata generated on the basis of the analysis results, additional information related to the text content, and the like.

The content-related information acquisition section 153 stores the acquired content-related information in a predetermined storage region of the storage section 111. The content-related information acquisition section 153 may directly output the acquired content-related information to the content reproduction control section 105.

An example of a function of the information processing device 10 according to this embodiment has been described above. Each component described above may be configured using a general-purpose member or circuit, or may be configured by hardware specialized for a function of each component. All functions of the components may be performed by a CPU or the like. Accordingly, it is possible to change a configuration to be appropriately used in response to an occasional technical level at which this embodiment is performed.

It is possible to create a computer program for realizing each function of the information processing device according to this embodiment as described above and mount the computer program on a personal computer or the like. A computer readable recording medium storing this computer program can be provided. For example, the recording medium is a magnetic disk, an optical disc, a magneto-optical disc, a flash memory, or the like. For example, the above-described computer program may be distributed via a network without use of the recording medium.

[Configuration of Content Analysis Server]

Next, the configuration of the content analysis server according to this embodiment will be described.

As shown in FIG. 7, the content analysis server 50 according to this embodiment mainly includes a recognition section 501, an additional information acquisition section 503, a content-related information providing section 505, and a storage section 507.

For example, the recognition section 501 is realized by a CPU, a ROM, a RAM, a communication device, or the like. The recognition section 501 performs various types of analyses of morphological analysis, syntactic analysis, and semantic analysis for text content requested from the analysis requesting section 151 of the information processing device 10. Also, the recognition section 501 generates metadata of the analyzed text content using analysis results obtained by the analyses. If various types of analysis processing for the text content and processing of generating metadata are terminated, the recognition section 501 generates metadata of the analyzed text content using the analysis results obtained by the analyses. If various types of analysis processing for the text content and metadata generation processing are terminated, the recognition section 501 outputs the obtained analysis results and the generated metadata to the additional information acquisition section 503 and the content-related information providing section 505 to be described later. Also, the recognition section 501 may record information obtained by the recognition processing in the storage section 507 to be described later.

Here, the recognition section 501 provided in the content analysis server 10 according to this embodiment has the same configurations as the recognition section 101 provided in the information processing device 10 according to the first embodiment of the present invention, and has the same advantageous effects as those. That is, the recognition section 501 according to this embodiment has the same configuration as the processing sections of the text analysis section 121, the scene specifying section 131, and the metadata generation section 133 as illustrated in FIG. 2, and performs text content analysis and metadata generation by the same processing. Accordingly, detailed description of the recognition section 501 is omitted hereinafter.

For example, the additional information acquisition section 503 is realized by a CPU, a ROM, a RAM, a communication device, or the like. The additional information acquisition section 503 acquires additional information related to requested text content using a text content recognition result (that is, analysis results by various types of analyses and generated metadata) by the recognition section 501.

The additional information acquisition section 503 acquires additional information related to text content from the outside of the text content. Specifically, the additional information acquisition section 503 can acquire the additional information from the storage section 507 or a removable recording medium inserted in a drive provided in the content analysis server 50 to be described later. The additional information acquisition section 503 may directly acquire the additional information as described above from an external connection device connected to a connection port provided in the content analysis server 50. The additional information acquisition section 503 may acquire the additional information using a search engine (database) provided in the information search server 20 via an external network such as the Internet 3.

Since the additional information acquisition processing that is performed by the additional information acquisition section 503 according to this embodiment is the same as the additional information acquisition processing that is performed by the additional information acquisition section 103 according to the first embodiment of the present invention and has the same advantageous effect as that, detailed description thereof is omitted hereinafter.

For example, the content-related information providing section 505 is realized by a CPU, a ROM, a RAM, a communication device, or the like. The content-related information providing section 505 provides the requesting information processing device 10 with information regarding the analysis results and metadata generated by the recognition section 501 and the additional information acquired by the additional information acquisition section 503 as content-related information.

The storage section 507 is an example of a storage device provided in the content analysis server 50. In the storage section 507, information regarding a text content recognition result by the recognition section 501 or various types of information accompanying the recognition result is stored. Also, in the storage section 507, various types of additional information acquired by the additional information acquisition section 503 are stored.

In the storage section 507, various types of history information such as history information regarding text content analyses and the like may be recorded. Also, in the storage section 507, various parameters to be stored when the content analysis server 50 according to this embodiment performs any processing, the progress during processing, or various types of databases are appropriately recorded.

Each processing section included in the information processing device 10 having the recognition section 501, the additional information acquisition section 503, the content-related information providing section 505, and the like can freely perform write and read operations on the storage section 507.

An example of a function of the content analysis server 50 according to this embodiment has been described above. Each component described above may be configured using a general-purpose member or circuit, or may be configured by hardware specialized for a function of each component. All functions of the components may be performed by a CPU or the like. Accordingly, it is possible to change a configuration to be appropriately used in response to an occasional technical level at which this embodiment is performed.

It is possible to create a computer program for realizing each function of the content analysis server according to this embodiment as described above and mount the computer program on a personal computer or the like. A computer readable recording medium storing this computer program can be provided. For example, the recording medium is a magnetic disk, an optical disc, a magneto-optical disc, a flash memory, or the like. For example, the above-described computer program may be distributed via a network without use of the recording medium.

As described above, in the information processing system 1 according to this embodiment, an external server serving as the content analysis server 50, not the information processing device 10, performs processing having a large processing load of a certain extent such as various types of analysis processing for the text content and additional information acquisition processing. Thereby, even when the information processing device 10 is a mobile information terminal having a small amount of resources, the user can comfortably enjoy realistic text content, so that the convenience for the user can be improved.

The case where the content analysis server 50 performs both of the text content recognition processing and the additional information acquisition processing has been described with reference to FIGS. 6 and 7, but the present invention is not limited to this example. That is, the content analysis server 50 may perform only the text content recognition processing in place of the information processing device 10, or may perform only the additional information acquisition processing in place of the information processing device 10.

The case where the information search server 20 and the content analysis server 50 are realized as different devices in FIGS. 6 and 7 has been described, but the information search server 20 and the content analysis server 50 may be the same device.

(Information Processing Method According to First and Second Embodiments)

Figure 8:
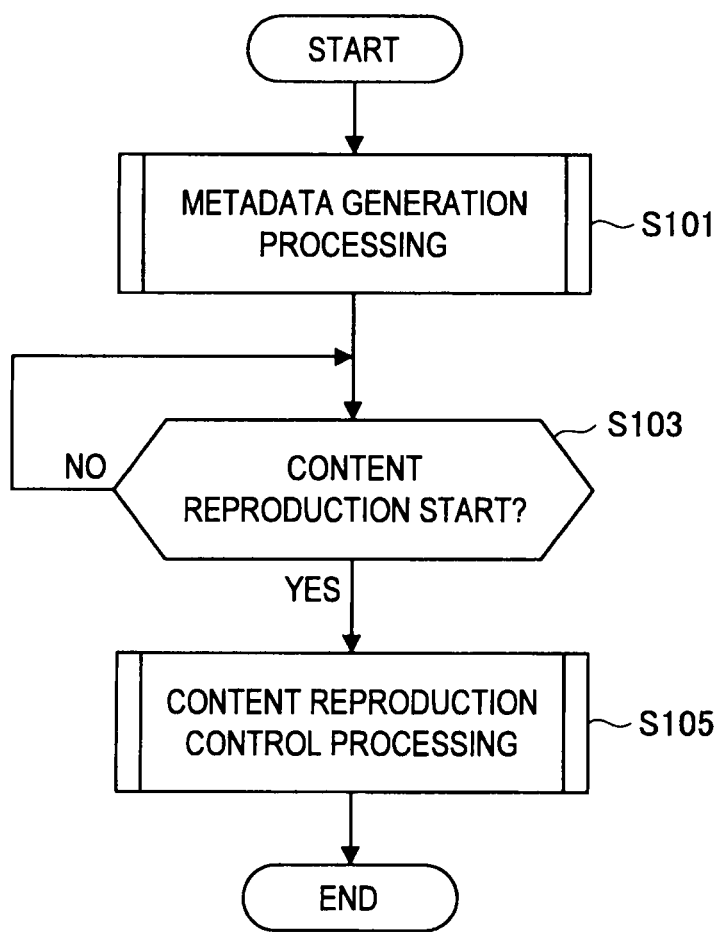
FIG. 8 is a flowchart showing a flow of the information processing method according to the first and second embodiments of the present invention.
Figure 9:
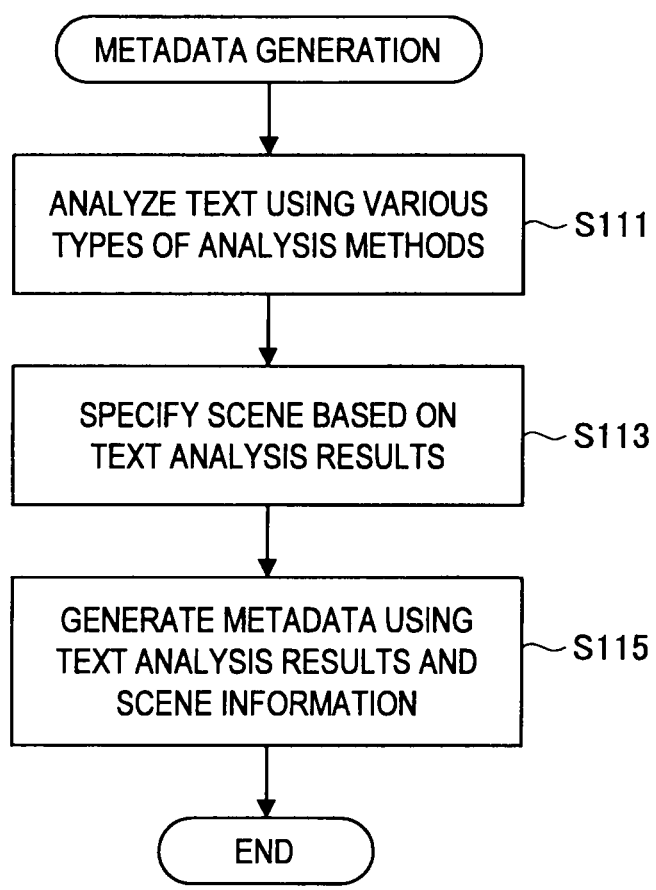
FIG. 9 is a flowchart showing a flow of metadata generation processing according to the first and second embodiments of the invention.
Figure 10:
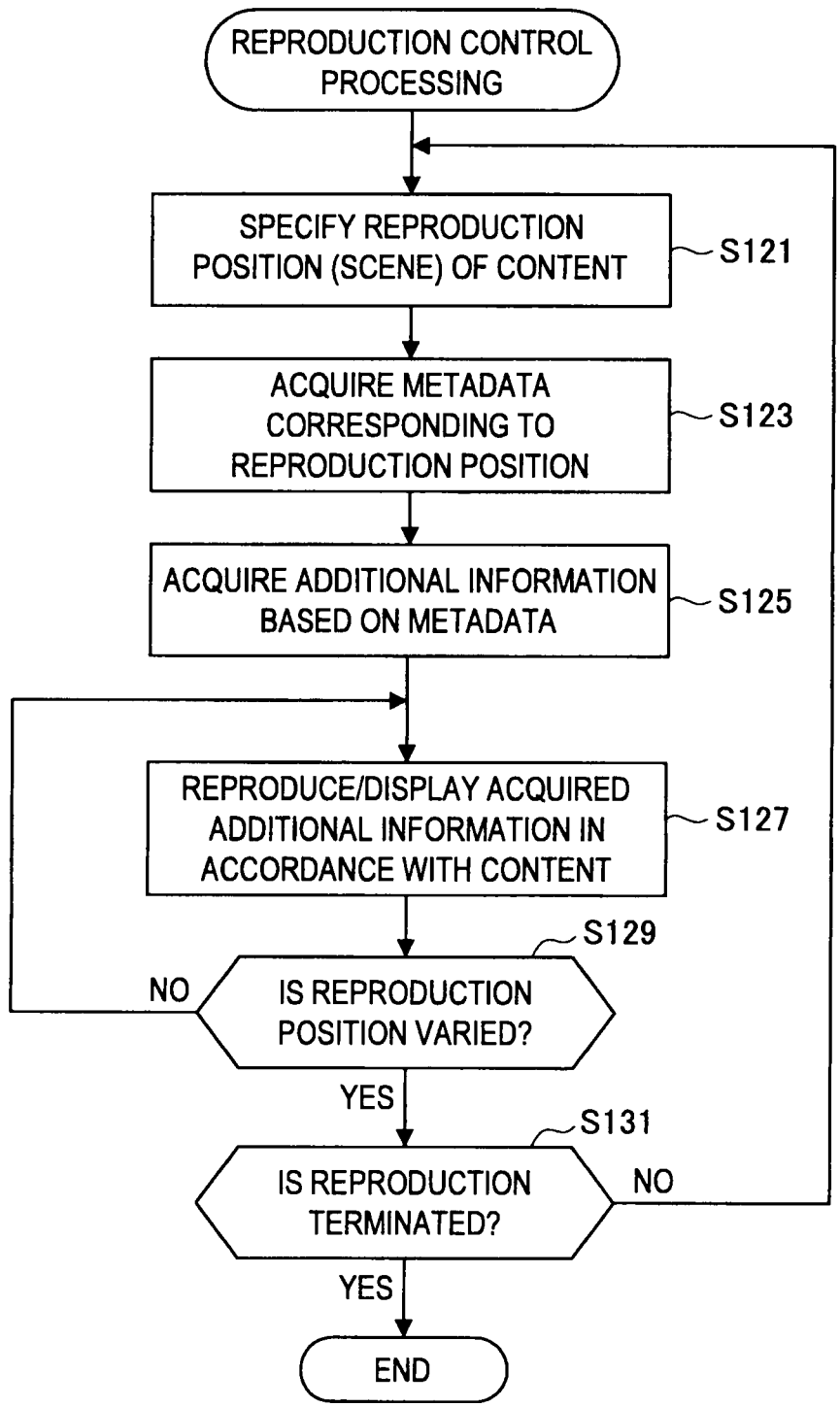
FIG. 10 is a flowchart showing a flow of content reproduction control processing according to the first and second embodiments of the present invention.

Next, a flow of the information processing method according to the first and second embodiments of the present invention will be described with reference to FIGS. 8 to 10. FIG. 8 is a flowchart showing the flow of the information processing method according to the first and second embodiments of the present invention. FIG. 9 is a flowchart showing a flow of metadata generation processing according to the first and second embodiments of the invention. FIG. 10 is a flowchart showing a flow of content reproduction control processing according to the first and second embodiments of the present invention.

First, an example of an operation that is performed by the information processing device 10 according to the first embodiment of the present invention in a rough flow of the information processing method according to the first and second embodiments of the present invention will be briefly described with reference to FIG. 8.

First, the information processing device 10 performs metadata generation processing for certain text content (step S101). If the metadata generation processing is terminated, the information processing device 10 stores an obtained result in a predetermined storage region of the storage section 111 or the like.

The information processing device 10 waits for the user to designate a text content reproduction start (step S103). If the user designates the text content reproduction start, the content reproduction control section 105 of the information processing device 10 performs text content reproduction control processing (step S105).

Next, the metadata generation processing of step S103 will be described in detail with reference to FIG. 9.

First, the text analysis section 121 provided in the recognition section 101 of the information processing device 10 analyzes text using various types of analysis methods (step S111). More specifically, the morphological analysis section 123 of the text analysis section 121 performs morphological analysis processing for text of the text content, and the syntactic analysis section 125 performs syntactic analysis processing for the text of the text content using an analysis result of the morphological analysis. The semantic analysis section 127 performs semantic analysis processing for the text of the text content using analysis results of the morphological analysis and the syntactic analysis. The analysis sections provided in the text analysis section 121 output analysis results to the scene specifying section 131 and the metadata generation section 133.

Thereafter, the scene specifying section 131 provided in the recognition section 101 specifies a scene of text content using various types of analysis results by the text analysis section 121 (step S113). If the scene specification is terminated, the specifying section 131 outputs information (scene information) indicating a scene specification result to the metadata generation section 133.

As illustrated in FIG. 3, the metadata generation section 133 generates metadata using the analysis results by the text analysis section 121 and the scene specification result (scene information) by the scene specifying section 131 (step S115). If the metadata generation is terminated, the metadata generation section 133 stores the generated metadata in the metadata storage section 137 of the storage section 111.

Next, a flow of content reproduction control processing that is performed by the content reproduction control section 105 will be briefly described with reference to FIG. 10.

If the user designates a reproduction start of certain text content, the content reproduction control section 105 specifies a reproduction position (scene) of the designated text content (step S121). If the user designates reproduction from the sentence beginning of the text content, this reproduction position is specified as a scene 1. If the user designates reproduction from a middle of the text content, this reproduction position is specified as a scene to which text designated by the user belongs.

Next, the content reproduction control section 105 acquires metadata corresponding to the designated text content by referring to the metadata storage section 137 of the storage section 111 (step S123). On the basis of the acquired metadata, the content reproduction control section 105 acquires additional information from the additional information storage section 139 of the storage section 111 (step S125).

Thereafter, the content reproduction control section 105 reproduces or displays the acquired additional information in accordance with content (step S127). Thereby, along with text of text content, various types of additional information are displayed on a display screen of the information processing device 10. The user of the information processing device 10 can browse realistic text content.

The content reproduction control section 105 determines whether a reproduction position is varied by the user's manipulation (that is, a page flipping manipulation) (step S129). If the reproduction position does not vary, the content reproduction control section 105 continues the processing by returning to step S127.

If the reproduction position varies, the content reproduction control section 105 determines whether or not the reproduction position after variation is outside the text content (that is, whether or not all text pieces to be displayed are displayed) (step S131). Simultaneously with this determination, the content reproduction control section 105 determines whether or not manipulation of an instruction that terminates the reproduction of text content is made. If there is text to be displayed, or if the reproduction termination instruction is not made, the content reproduction control section 105 continues the processing by returning to step S121. If there is no text to be displayed, or if the reproduction termination instruction is made, the content reproduction control section 105 terminates the content reproduction processing.

By performing the processing as described above, it is possible to more easily give a realistic sensation to text content.

Third Embodiment

Configuration of Information Processing Device

Subsequently, an information processing device and an information processing method according to the third embodiment of the present invention will be described with reference to FIGS. 11 to 17.

An information processing device 10 according to this embodiment is a device capable of displaying text content including at least text data, and displays the acquired text content on a display section of a display or the like provided in the device. The information processing device 10 can access an information search server 20 via an external network such as the Internet 3.

Like the information processing device 10 according to the first embodiment of the present invention shown in FIG. 1, the information processing device 10 mainly includes a recognition section 101, an additional information acquisition section 103, a content reproduction control section 105, a display section 107, an audio output section 109, and a storage section 111.

For example, the recognition section 101 according to this embodiment is realized by a CPU, a ROM, a RAM, or the like. The recognition section 101 analyzes at least part of the text content using various types of methods, and recognizes a feature keyword representing a feature of the analyzed at least part of the text content.

Here, a modification relation between a case and a predicate can be included in addition to a case, a part of speech, or an atmosphere (mood) of text described in the first and second embodiments as an example of a feature keyword recognized by the recognition section 101.

If the recognition section 101 recognizes a feature keyword representing a feature of at least part of text content, information regarding a recognition result is stored in a predetermined storage position of the storage section 111 to be described later. Also, the recognition section 101 outputs information regarding the recognition result to the additional information acquisition section 103.

A detailed configuration and function of the recognition section 101 according to this embodiment will be described again below.

For example, the additional information acquisition section 103 is realized by a CPU, a ROM, a RAM, a communication device, or the like. In response to a keyword recognized by the recognition section 101, the additional information acquisition section 103 acquires additional information related to text content from the outside of the text content. For example, the additional information may include audio information such as a sound effect, BGM, or the like, image information of a still image and a motion image regarding a still life, a landscape, a person, or the like, text information such as a meaning of a certain phrase or related information related to a certain phrase, or the like. This example of the additional information is only exemplary, and the present invention is not limited thereto. The additional information acquisition section 103 stores the acquired additional information in a predetermined position of the storage section 111.

Here, the content reproduction control section 105, the display section 107, the audio output section 109, and the storage section 111 according to this embodiment have the same configurations as the content reproduction control section 105, the display section 107, the audio output section 109, and the storage section 111 according to the first embodiment of the present invention, and have the same advantageous effects as those. Accordingly, detailed description thereof is omitted hereinafter.

[Configuration of Recognition Section]

Figure 11:
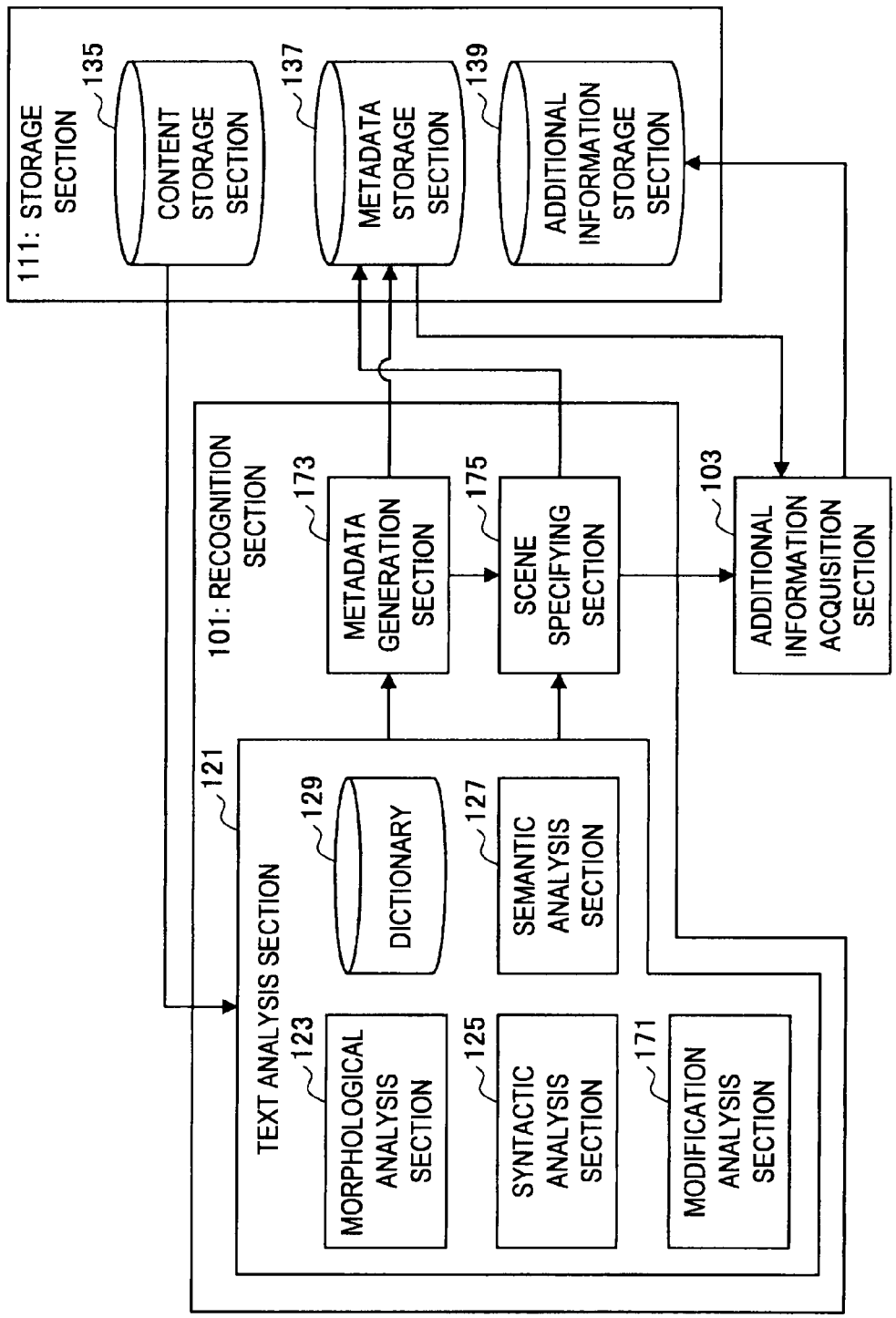
FIG. 11 is a block diagram illustrating a configuration of the information processing device according to a third embodiment of the present invention.

Next, a detailed configuration of the recognition section 101 provided in the information processing device 10 according to this embodiment will be described with reference to FIG. 11. FIG. 11 is a block diagram illustrating the configuration of the information processing device 10 according to this embodiment.

The recognition section 101 further includes a text analysis section 121, a metadata generation section 173, and a scene specifying section 175 as shown in FIG. 11.

For example, the text analysis section 121 is realized by a CPU, a ROM, a RAM, or the like. The text analysis section 121 analyzes feature keywords such as a keyword, a case, a part of speech, and a modification relation of text by analyzing the text of text content, and also extracts various other information regarding the text.

As shown in FIG. 11, the text analysis section 121 also has a morphological analysis section 123, a syntactic analysis section 125, a semantic analysis section 127, a dictionary memory section 129, and a modification analysis section 171.

The case where the text analysis section 121 has the syntactic analysis section 125 and the semantic analysis section 127 will be described below, but the text analysis section 121 may not have the syntactic analysis section 125 and the semantic analysis section 127. In this case, a feature keyword recognition method will be described again below.

Here, the morphological analysis section 123, the syntactic analysis section 125, the semantic analysis section 127, and the dictionary memory section 129 according to this embodiment have the same configurations as the morphological analysis section 123, the syntactic analysis section 125, the semantic analysis section 127, and the dictionary memory section 129 according to the first embodiment of the present invention, and have the same advantageous effects as those. Accordingly, detailed description thereof is omitted hereinafter.

For example, the modification analysis section 171 is realized by a CPU, a ROM, a RAM, or the like. The modification analysis section 171 analyzes a modification relation between a case and a predicate of text on the basis of the analysis results in the morphological analysis section 123, the syntactic analysis section 125, the semantic analysis section 127, and the like. Here, the predicate is an element of text including a continuous modification clause and a predicate clause. According to a focused sentence, the predicate may include the continuous modification clause and the predicate clause as described above, or may include only the predicate clause.

Specifically, the modification analysis section 171 extracts "the gist of the sentence" (in other words, the proposition of the sentence) including a predicate and elements (a case, a clause, and the like) directly related to the predicate from each text by referring to the morphological analysis result, the syntactic analysis result, and the semantic analysis result. On that basis, the modification analysis section 171 determines that each case (a locative case, a temporal case, or the like) in "the gist of the sentence" expresses a meaning (a location, a time, or the like) in the text.

That is, the modification analysis section 171 can determine the location, the time, or the like of the focused text on the basis of the modification relation between the case and the predicate after recognizing "the gist of the sentence" by referring to the text analysis results.

Figure 12:
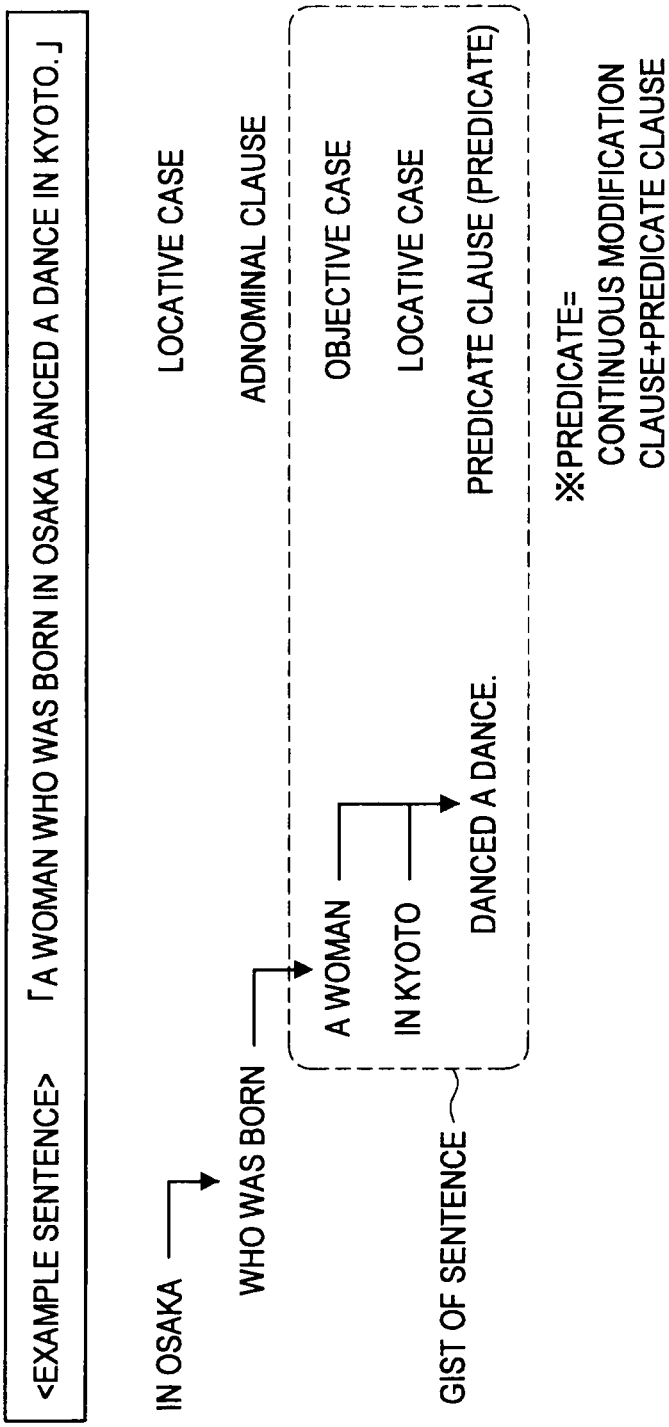
FIG. 12 is an illustrative diagram showing an example of a method of analyzing a modification relation between a case and a predicate according to the same embodiment.

Hereinafter, an example sentence shown in FIG. 12 will be described and an example of analysis that is performed by the modification analysis section 171 will be specifically described. FIG. 12 is an illustrative diagram showing an example of a method of analyzing the modification relations between the case and the predicate according to this embodiment.

As shown in FIG. 12, the case where the modification analysis section 171 analyzes a modification relation of the text "A woman who was born in Osaka danced a dance in Kyoto," is in focus. In this example sentence, it becomes apparent that the following elements are in text and a configuration of the text as shown in FIG. 12 becomes apparent when morphological analysis, syntactic analysis, and semantic analysis are performed.

Locative case: "in Osaka," "in Kyoto"
Adnominal clause: "who was born"
Objective case: "A woman"
Predicate clause: "danced a dance."

As shown in FIG. 12, the locative case of "in Osaka" is related to the adnominal clause "who was born," the adnominal clause "who was born" is related to the objective case of "a woman," and the objective case of "a woman" and the locative case "in Kyoto" is related to the predicate clause "dances a dance."

Here, the modification analysis section 171 specifies the predicate in the focused text and extracts text elements directly related to the specified predicate. In the example shown in FIG. 12, the objective case of "a woman" and the locative case of "in Kyoto" directly related to the predicate clause are extracted as elements constituting "the gist of the sentence" since the predicate clause "danced a dance" is specified. Thereby, the content "A woman dances a dance in Kyoto," is extracted as "the gist of the sentence" focused in FIG. 12.

There are two locative cases in the focused example sentence, but the modification analysis section 171 determines that the content "A woman dances a dance in Kyoto." is the gist of the sentence, and hence determines that the locative case of "in Kyoto" is an element indicating a location in this example sentence.

The modification analysis section 171 can use various types of dictionary files stored in the dictionary memory section 129 or the like when analyzing a modification relation between the case and the predicate.

The text analysis section 121 provided in the recognition section 101 according to this embodiment has been described above in detail.

For example, the metadata generation section 173 is realized by a CPU, a ROM, a RAM, or the like. The metadata generation section 173 generates metadata related to text content using text data itself corresponding to the text content and the text analysis results by the text analysis section 121.

FIG. 13 is an example of items and content pieces of the metadata generated by the metadata generation section 173. As illustrated in FIG. 13, the metadata generation section 173 generates information regarding cases of a sentence within text content, information regarding a characteristic keyword (feature keyword) in the sentence, information regarding an imitative sound in the sentence, and information regarding an atmosphere (mood or emotion) of the sentence as metadata.

Here, information regarding the cases shown in FIG. 13 may include information regarding a predicate related to a case as well as the cases themselves and may be associated therewith.

Information regarding the mood (atmosphere or emotion) shown in FIG. 13 is determined using the analysis result by the modification analysis section 171, or the like as well as the analysis result by the syntactic analysis section 125, the semantic analysis section 127, or the like.

The metadata generation section 173 stores the metadata generated as described above in the metadata storage section 137 provided in the storage section 111. Thereby, the additional information acquisition section 103, the content reproduction control section 105, or the scene specifying section 175 provided in the information processing device 10 can freely use the metadata stored in the metadata storage section 137. The metadata generation section 173 may directly output the metadata generated as described above to the scene specifying section 175.

A metadata format shown in FIG. 13 is only exemplary, and a metadata structure according to the present invention is not limited to the example shown in FIG. 13.

For example, the scene specifying section 175 is realized by a CPU, a ROM, a RAM, or the like. The scene specifying section 175 specifies a scene of content using at least any one of text data itself corresponding to text content, various types of analysis results of the text analysis section 121, and metadata of the text content.

For example, text may be described after paragraphing or chaptering according to the text content. The scene specifying section 175 can decide a content scene on the basis of the paragraphing or chaptering.

As described in the first embodiment, the scene specifying section 175 can decide a content scene based on an appearance range of a feature keyword extracted by text analysis of the text analysis section 121. Also, the scene specifying section 175 can decide a variation of feature metadata as a scene break according to feature metadata such as a location, a time, a mood, or the like of each sentence as context.

By performing this processing, the scene specifying section 175 can divide the text content into several scenes.

If a scene of text of text content is specified, the scene specifying section 175 appends information indicating a scene specification result (information regarding a sentence belonging to the same scene, information regarding a position where a scene is varied, or the like) to metadata stored in the metadata storage section 137.

The configuration of the recognition section 101 according to this embodiment has been described above in detail with reference to FIGS. 11 to 13.

Feature Keyword Extraction Processing Using Only Morphological Analysis

Hereinafter, an example of extracting a feature keyword from text content using only an analysis result by the morphological analysis section 123 will be briefly described with reference to FIG. 14. FIG. 14 is an illustrative diagram showing an example of the feature keyword extraction method according to this embodiment.

The morphological analysis section 123 performs morphological analysis for text content, so that each sentence constituting the content is broken into morphemes and a part of speech of each morpheme is specified. Here, the morphological analysis section 123 can extract a keyword satisfying a predetermined condition as a feature keyword by calculating a score value of the keyword on the basis of a type or occurrence frequency of a part of speech.

The morphological analysis section 123 may perform processing of combining morphemes if necessary upon extraction of a feature keyword. For example, if there are a morpheme corresponding to the "sex" of a person and a morpheme corresponding to a "name," the morphological analysis section 123 may combine the morphemes and handle the combined morphemes as morphemes regarding the "person."

According to a sentence, a demonstrative pronoun may be in the sentence. In this case, anaphoric analysis can be performed if necessary, content indicated by the demonstrative pronoun can be specified, and analysis to which a specification result is added can be performed.

Hereinafter, a feature keyword extraction method using morphological analysis by focusing on an example sentence as shown in FIG. 14 will be specifically described.

If the morphological analysis is performed for the example sentence as shown in FIG. 14, it is possible to obtain an analysis result as shown on the center left of FIG. 14. In the following description, a case of focusing on the noun "Sakamoto Ryoma" will be described. Since the noun appears three times in the example sentence, an occurrence frequency of the noun becomes 3. It is assumed that a part-of-speech coefficient table as shown on the center right of FIG. 14 is stored in the storage section 111, the dictionary memory section 129, or the like, and a part-of-speech coefficient is decided in advance for a part of speech of each morpheme. By referring to a dictionary file stored in the dictionary memory section 129 or the like, the morphological analysis section 123 can recognize that the noun "Sakamoto Ryoma" is a personal name. Thus, the morphological analysis section 123 acquires a part-of-speech coefficient value of "Noun: Person" by referring to the part-of-speech coefficient table. In an example shown in FIG. 14, the morphological analysis section 123 acquires 3 as a part-of-speech coefficient of "Noun: Person."

The morphological analysis section 123 calculates a sum of a part-of-speech coefficient and an occurrence frequency as a score value of a focused morpheme (a part of speech). Accordingly, in the example shown in FIG. 14, a score value of the noun "Sakamoto Ryoma" becomes (3 Points for Part-of-speech Coefficient+3 Points for Occurrence Frequency=6 Points).

If score values of keywords (parts of speech) constituting each sentence in text content are respectively calculated, the morphological analysis section 123 extracts a keyword satisfying a predetermined condition as a feature keyword of focused content. It is possible to appropriately set a condition when a feature keyword is extracted, but, for example, it is also possible to use whether or not a calculated score value is equal to or greater than a predetermined threshold or a condition such as the top N when the score values are arranged in descending order.

By performing this processing, the morphological analysis section 123 can extract a feature keyword from text content using only morphological results.

A score value calculated by the morphological analysis section 123 is not limited to the sum of the part-of-speech coefficient and the occurrence frequency, but the score value may be a product of the part-of-speech coefficient and the occurrence frequency or a numerical value calculated on the basis of other calculation methods may be handled as the score value.

A feature keyword extraction method using only a morphological analysis result is not limited to the above-described example. For example, a feature keyword may be extracted by performing processing of matching with a dictionary file. That is, for a focused sentence, a matching evaluation value is calculated until the predetermined number of characters is reached by incrementing the number of characters for which matching with the dictionary file is performed for characters one by one from the sentence beginning. A feature keyword is extracted from the sentence by focusing on a peak position (that is, the number of characters) of the calculated matching evaluation value.

An example of a function of the information processing device 10 according to this embodiment has been described above. Each component described above may be configured using a general-purpose member or circuit, or may be configured by hardware specialized for a function of each component. All functions of the components may be performed by a CPU or the like. Accordingly, it is possible to change a configuration to be appropriately used in response to an occasional technical level at which this embodiment is performed.

It is possible to create a computer program for realizing each function of the information processing device according to this embodiment as described above and mount the computer program on a personal computer or the like. A computer readable recording medium storing this computer program can be provided. For example, the recording medium is a magnetic disk, an optical disc, a magneto-optical disc, a flash memory, or the like. For example, the above-described computer program may be distributed via a network without use of the recording medium.

<Information Processing Method>

Subsequently, a flow of the information processing method according to this embodiment will be described.

Since a schematic flow of the information processing method that is performed by the information processing device 10 according to this embodiment is the same as that according to the first embodiment shown in FIG. 8, detailed description thereof is omitted.

Figure 15:
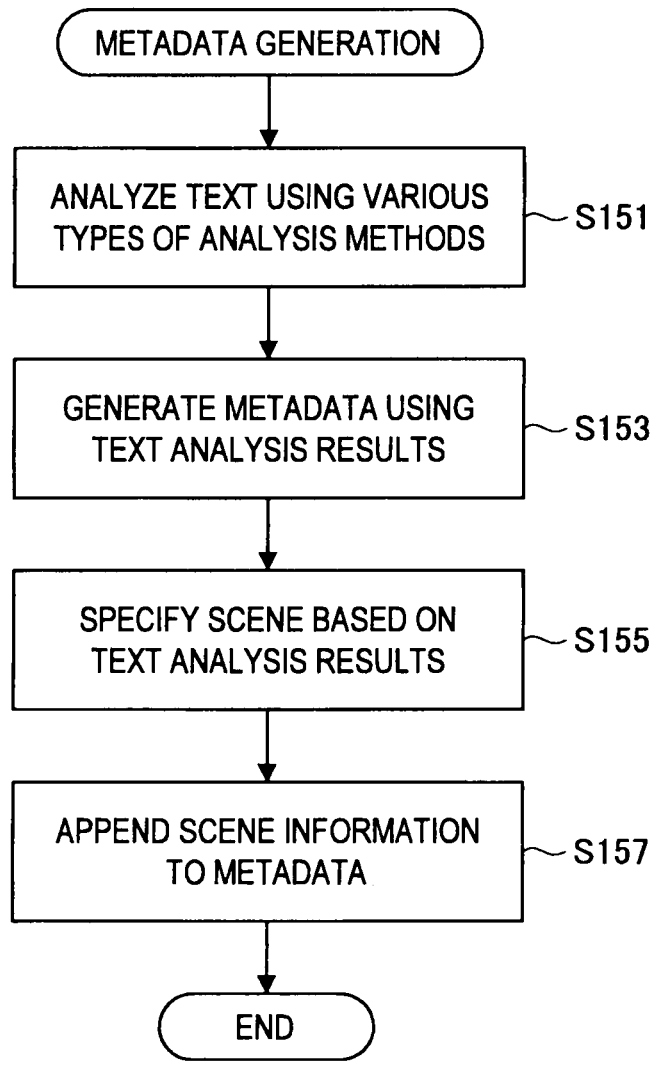
FIG. 15 is a flowchart showing an example of a flow of a metadata generation method according to the same embodiment.

First, metadata generation processing in the information processing method according to this embodiment will be described in detail with reference to FIG. 15. FIG. 15 is a flowchart showing the information processing method (metadata generation method) according to this embodiment.

Hereinafter, the case where the text analysis section 121 of the recognition section 101 includes the morphological analysis section 123, the syntactic analysis section 125, the semantic analysis section 127, the dictionary memory section 129, and the modification analysis section 171 will be described.

First, the text analysis section 121 provided in the recognition section 101 of the information processing device 10 performs text analysis using various types of analysis methods (step S151). More specifically, the morphological analysis section 123 of the text analysis section 121 performs morphological analysis processing for text of text content, and the syntactic analysis section 125 performs syntactic analysis processing for the text of the text content using an analysis result of the morphological analysis. The semantic analysis section 127 performs semantic analysis processing for the text of the text content using analysis results of the morphological analysis and the semantic analysis. The modification analysis section 171 analyzes a modification relation between a case and a predicate for the text of the text content using analysis results of the syntactic analysis section 125 and the semantic analysis section 127. Each analysis section provided in the text analysis section 121 outputs the analysis result to the metadata generation section 173 and the scene specifying section 175.

Thereafter, the metadata generation section 173 provided in the recognition section 101 generates metadata as illustrated in FIG. 13 using text data itself corresponding to the text content and text analysis results by the text analysis section 121 (step S153). If the metadata generation is terminated, the metadata generation section 173 stores the generated metadata in the metadata storage section 137 of the storage section 111.

Next, the scene specifying section 175 provided in the recognition section 101 specifies a content scene using any one of the text data itself corresponding to the text content, various types of analysis results of the text analysis section 121, and the metadata of the text content (step S155). If the scene specification is terminated, the scene specifying section 175 appends information (scene information) indicating a scene specification result to the metadata stored in the metadata storage section 137 (step S157).

The recognition section 101 of the information processing device 10 according to this embodiment can generate the metadata of the text content by performing processing in the above-described flow.

Figure 16:
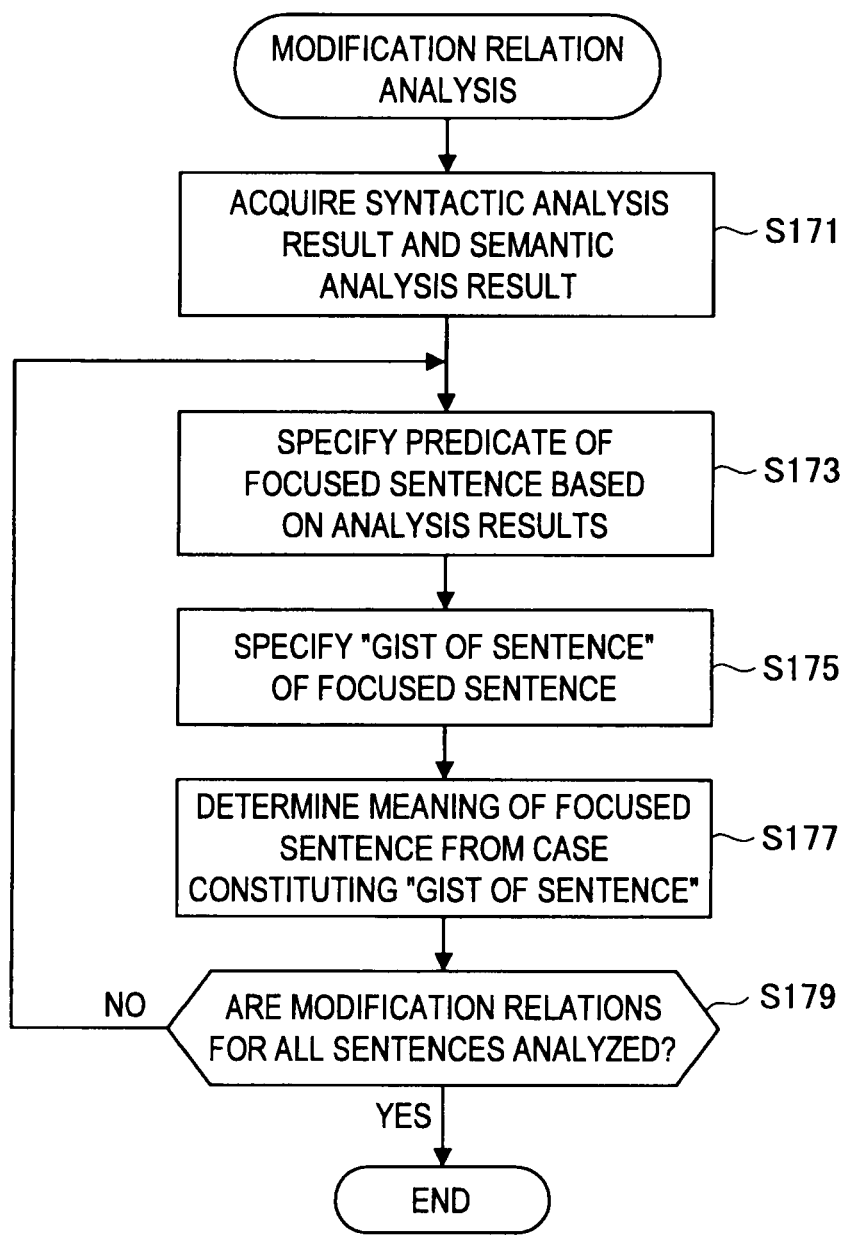
FIG. 16 is a flowchart showing an example of a flow of a modification relation analysis method according to the same embodiment.

Next, a flow of a modification analysis method that is performed by the modification analysis section 171 provided in the text analysis section 121 according to this embodiment will be described with reference to FIG. 16. FIG. 16 is a flowchart showing an example of the flow of the modification analysis method according to this embodiment.

First, the modification analysis section 171 acquires the syntactic analysis result of the syntactic analysis section 125 and the semantic analysis result of the semantic analysis section 127 (step S171). Thereafter, the modification analysis section 171 specifies a predicate of a focused sentence on the basis of the acquired analysis results (step S173).

Subsequently, the modification analysis section 171 specifies a predicate of a specified sentence and a case or clause directly related to the predicate, and designates the case or clause and the predicate as "the gist of the sentence" (step S175). The modification analysis section 171 determines that "the gist of the sentence" specified indicates a meaning (for example, a time, a location, or the like) of the focused sentence, and determines a meaning of the focused sentence from cases constituting "the gist of the sentence" (step S177).

If modification relation analysis for a certain sentence constituting text content is terminated, the modification analysis section 171 determines whether or not modification analysis for all sentences constituting the text content is performed (step S179). If all of the sentences are not analyzed, the modification analysis section 171 continues modification analysis processing for an unanalyzed sentence by returning to step S173. On the other hand, if all of the sentences are analyzed, the modification analysis section 171 terminates the modification relation analysis processing, and outputs an analysis result to the metadata generation section 173 and the scene specifying section 175.

The flow of processing of analyzing a modification relation between a case and a predicate that is performed by the modification analysis section 171 has been described above with reference to FIG. 16.

Figure 17:
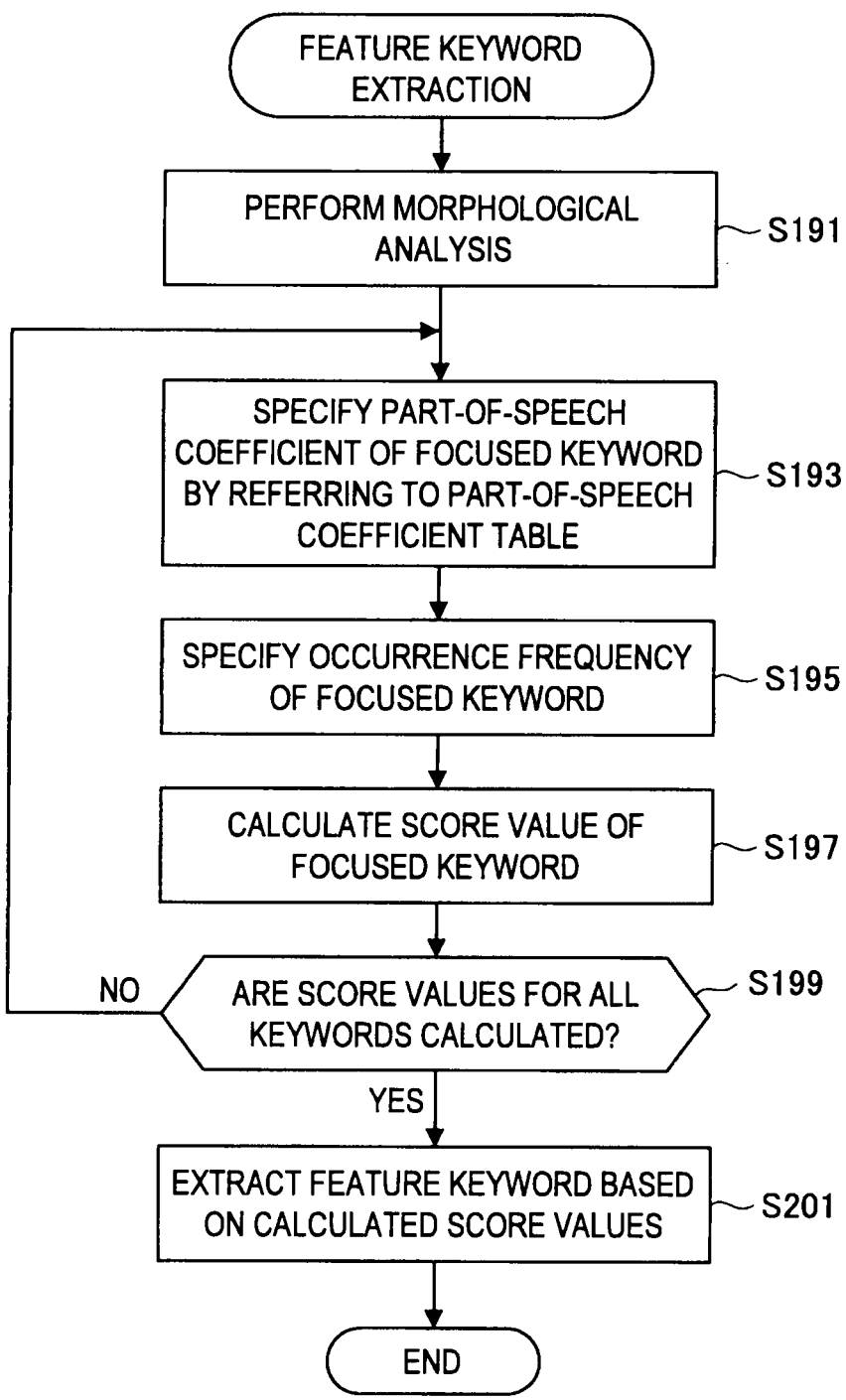
FIG. 17 is a flowchart illustrating an example of a flow of the feature keyword extraction method according to the same embodiment.

Next, a flow of feature keyword extraction processing when the morphological analysis section 123 extracts a keyword using only a morphological analysis result will be briefly described with reference to FIG. 17. FIG. 17 is a flowchart showing an example of the flow of feature keyword extraction processing based on the morphological analysis result.

In this case, the morphological analysis section 123 first performs morphological analysis for each sentence constituting focused text content (step S191). Thereby, each sentence constituting the text content is broken for each morpheme and a plurality of keywords are extracted.

Next, the morphological analysis section 123 specifies a part-of-speech coefficient of a focused keyword by focusing on one of a plurality of keywords constituting the text content and referring to a part-of-speech coefficient table stored in the storage section 111, the dictionary memory section 129, or the like (step S193). Next, the morphological analysis section 123 specifies an occurrence frequency of the focused keyword (step S195). Here, the keyword occurrence frequency may be the occurrence frequency within a paragraph, a chapter, or a scene, or may be the occurrence frequency within the entire text content.

Subsequently, the morphological analysis section 123 calculates a score value of the focused keyword using the specified part-of-speech and occurrence frequency (step S197).

Thereafter, the morphological analysis section 123 determines whether or not score values for all keywords are calculated within a range of the focused content (for example, the paragraph, the chapter, the scene, the entire content, or the like) (step S199). If the score values for all of the keywords within the focused range are not calculated, the morphological analysis section 123 continues the processing by returning to step S193. On the other hand, if the score values for all of the keywords within the focused range are calculated, the morphological analysis section 123 extracts a keyword satisfying a predetermined condition as a feature keyword on the basis of the calculated score values (step S201).

By performing in the flow as described above, the morphological analysis section 123 can extract a feature keyword from only the morphological analysis result.

The information processing method that is performed by the information processing device 10 according to this embodiment has been described above in detail.

(Hardware Configuration)

Figure 18:
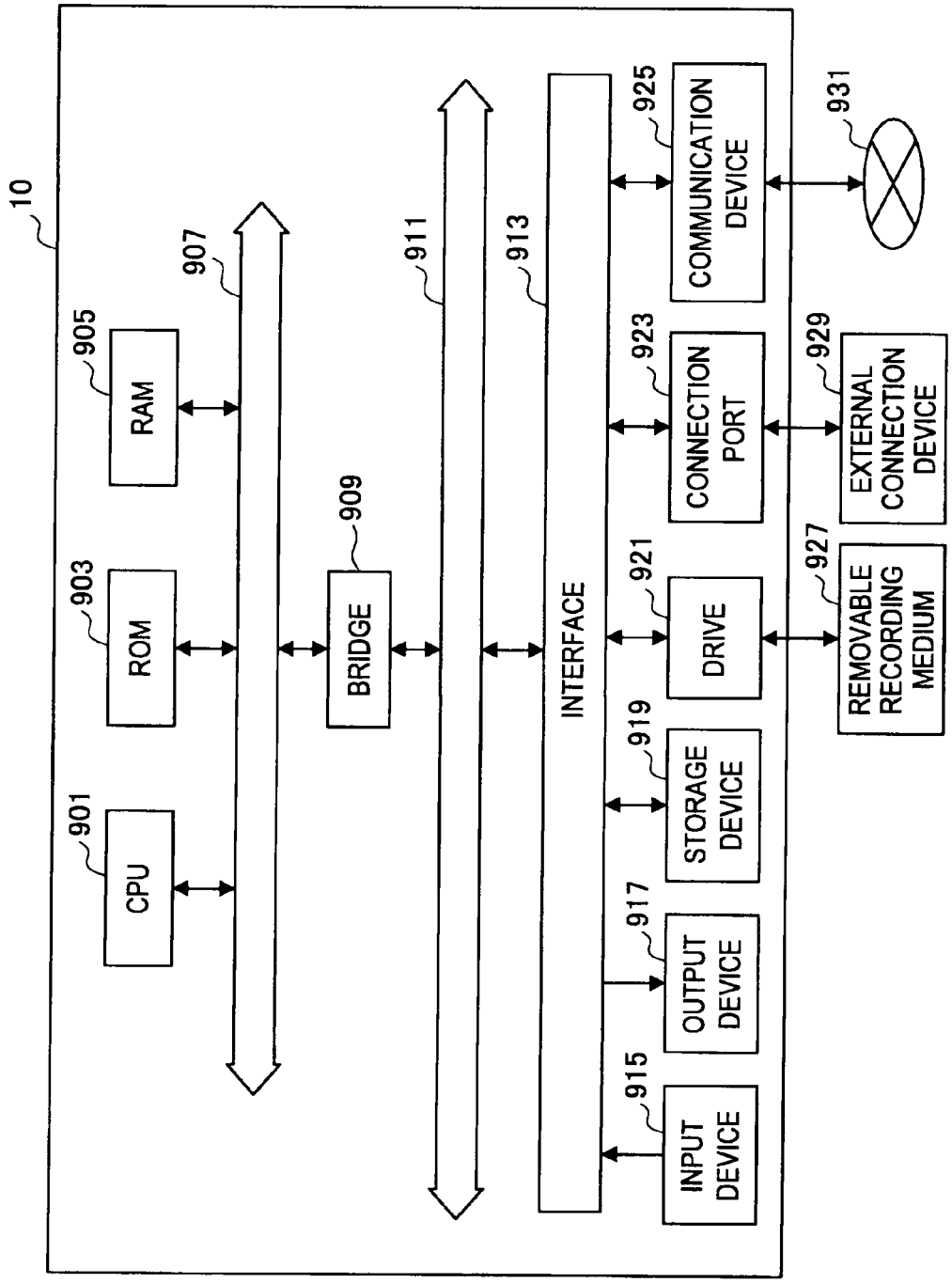
FIG. 18 is a block diagram showing a hardware configuration of the information processing device according to an embodiment of the present invention.

Next, the hardware configuration of the information processing apparatus 10 according to the embodiment of the present invention will be described in detail with reference to FIG. 18. FIG. 18 is a block diagram for illustrating the hardware configuration of the information processing apparatus 10 according to the embodiment of the present invention.

The information processing apparatus 10 mainly includes a CPU 901, a ROM 903, and a RAM 905. Furthermore, the information processing apparatus 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and acoustic signal data or image signal data, or the like, obtained from externally.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains acoustic signal data or image signal data from the externally connected apparatus 929 and provides acoustic signal data or image signal data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Since a hardware configuration of the content analysis server 50 according to the second embodiment of the present invention is the same as that of the information processing device 10 according to the embodiment of the present invention, detailed description thereof is omitted.

(Summary)

According to the information processing device and the information processing method according to the embodiments of the present invention as described above, additional information related to text content is automatically acquired and is output along with part of the text content. As a result, the user of the information processing device can significantly realistically experience reading.

The case where the text analysis section analyzes text of text content by various types of analysis processing has been described in the above-described embodiments, but the text analysis section may generate metadata or the like by performing matching with a predetermined dictionary file set for each content genre or the like without performing various types of analysis processing.

Preferred embodiments of the present invention have been described above in detail with reference to the appended drawings, but the present invention is not limited thereto. It should be understood by those skilled in the art that various modifications, combinations, sub-combinations and alterations may occur depending on design requirements and other factors insofar as they are within the scope of the appended claims or the equivalents thereof.

An example of Japanese text content has been described in the above-described embodiments, but the present invention is not limited thereto. For example, if an analysis tool (a morphological analysis tool, a syntactic analysis tool, a semantic analysis tool, or the like) of a corresponding language can be used, the information processing device according to the above-described embodiments is applicable for text content generated using any language such as English, French, German, Chinese, Korean, Italian, Spanish, or Portuguese.

Content described in the first and second embodiments of the present invention can be appropriately applied to the third embodiment of the present invention, and content described in the third embodiment of the present invention can be appropriately applied to the first and second embodiments of the present invention.

The present application contains subject matter related to that disclosed in Japanese Priority Patent Application JP 2010-057818 filed in the Japan Patent Office on Mar. 15, 2010 and Japanese Priority Patent Application JP 2010-249463 filed in the Japan Patent Office on Nov. 8, 2010, the entire content of which is hereby incorporated by reference.

What is claimed is:

1. An information processing device comprising:
   a recognizer that recognizes a feature keyword representing a feature of at least part of text content each time a reproduction position corresponding to the text content is changed;
   an additional information acquirer that acquires additional information related to the text content from an outside of the text content in response to the recognized feature keyword each time the reproduction position corresponding to the text content is changed and the recognized feature keyword differs from a previously feature keyword recognized from a different part of the text content; and
   a controller that controls the additional information acquired by the additional information acquisition section to be output along with the part of the text content.

2. The information processing device according to claim 1, wherein the recognizer recognizes the feature keyword representing the feature of at least the part of the text content by morphological analysis.

3. The information processing device according to claim 2, wherein the recognizer recognizes a part of speech of at least the part of the text content as the feature keyword.

4. The information processing device according to claim 2, wherein the recognizer recognizes a case of at least the part of the text content as the feature keyword.

5. The information processing device according to claim 1, wherein the recognizer recognizes a modification relation between a case and a predicate of at least the part of the text content.

6. The information processing device according to claim 1, wherein the recognizer further specifies a scene of at least the part of the text content on the basis of the recognized feature keyword.

7. The information processing device according to claim 6, wherein the recognizer registers the extracted feature keyword as metadata associated with the specified scene.

8. The information processing device according to claim 6, wherein:
   the recognizer specifies an atmosphere of the scene on the basis of the recognized feature keyword and the text content, and
   the additional information acquirer selects music to be reproduced in the scene on the basis of the atmosphere of the scene specified by the recognizer.

9. The information processing device according to claim 1, wherein the additional information acquirer searches a database that is external to the information processing device using the feature keyword extracted by the recognizer, and acquires information obtained from a search result as the additional information.

10. The information processing device according to claim 1, wherein the recognizer recognizes the feature keyword based on morphological, syntactic, and semantic analysis of the text content.

11. The information processing device according to claim 1, wherein the recognizer recognizes the feature keyword based on a part-of-speech coefficient table.

12. The information processing device according to claim 11, wherein the part-of-speech coefficient table stores scores in association with different types of at least one part of speech in the text content.

13. The information processing device according to claim 12, wherein the at least one part of speech includes a noun, and the different types of the at least one part of speech include a person, place, or thing.

14. An information processing method for use in an information processing device, comprising the steps of:
   recognizing a feature keyword representing a feature of at least part of text content each time a reproduction position corresponding to the text content is changed;
   acquiring additional information related to the text content from an outside of the text content in response to the recognized feature keyword each time the reproduction position corresponding to the text content is changed and the recognized feature keyword differs from a previously feature keyword recognized from a different part of the text content;
   controlling, by at least one hardware processor in the information processing device, the acquired additional information to be output along with the part of the text content.

15. A non-transitory computer-readable storage medium having computer readable program codes embodied in the computer-readable storage medium that, when executed cause a computer to execute:
    recognizing a feature keyword representing a feature of at least part of text content each time a reproduction position corresponding to the text content is changed;
    acquiring additional information related to the text content from an outside of the text content in response to the recognized feature keyword each time the reproduction position corresponding to the text content is changed and the recognized feature keyword differs from a previously feature keyword recognized from a different part of the text content; and
    controlling the additional information to be output along with the part of the text content.

\* \* \* \* \*